United States Patent
Sun et al.

(10) Patent No.: US 9,825,798 B1
(45) Date of Patent: Nov. 21, 2017

(54) MODULATION ORDER SPLIT TRANSMISSIONS USING A UNIFORM CONSTELLATION

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/426,883

(22) Filed: Feb. 7, 2017

Related U.S. Application Data

(60) Provisional application No. 62/334,975, filed on May 11, 2016.

(51) Int. Cl.
*H04L 5/12* (2006.01)
*H04L 27/34* (2006.01)
(Continued)

(52) U.S. Cl.
CPC ........ *H04L 27/3411* (2013.01); *H04L 5/0073* (2013.01); *H04L 27/20* (2013.01); *H04L 27/362* (2013.01)

(58) Field of Classification Search
CPC ............... H04L 1/0054; H04L 27/2627; H04L 27/2649; H04L 27/36; H04L 27/38; H04L 27/2601; H04L 27/34; H04L 27/20; H04L 5/00; H04N 21/2383; H04N 21/4382; H04N 21/234327; H04N 21/631; H04N 21/43637

(Continued)

(56) References Cited

U.S. PATENT DOCUMENTS

| 7,725,799 B2* | 5/2010 | Walker ................ H04L 27/3488 714/755 |
| 2015/0171947 A1 | 6/2015 | Sun et al. |
| 2017/0012754 A1 | 1/2017 | Sun et al. |

FOREIGN PATENT DOCUMENTS

| EP | 2222009 A1 | 8/2010 |
| WO | WO-2004105337 A1 | 12/2004 |

OTHER PUBLICATIONS

ISA/EP, International Search Report and Written Opinion of the International Searching Authority, Int'l Application No. PCT/US2017/018649, May 15, 2017, European Patent Office, Rijswijk, NL, 14 pgs.

\* cited by examiner

*Primary Examiner* — Rahel Guarino
(74) *Attorney, Agent, or Firm* — Nerrie M. Zohn

(57) ABSTRACT

A combined symbol constellation may be selected from a uniform symbol constellation that is supported by a de-mapper to provide additional power split options while reducing modifications to the de-mapper. In some examples, a signal may be constructed according to a combined symbol constellation selected from a larger uniform symbol constellation based on a desired power-ratio. The signal may include a base-layer, used to communicate a first set of data, and an enhancement-layer, used to communicate a second set of data, in accordance with the selected combined symbol constellation. The signal may be received and de-mapped according to the combined symbol constellation at a de-mapper that supports a uniform symbol constellation that is larger than the combined symbol constellation.

49 Claims, 12 Drawing Sheets

(51) Int. Cl.
   *H04L 27/20* (2006.01)
   *H04L 27/36* (2006.01)
   *H04L 5/00* (2006.01)
(58) Field of Classification Search
   USPC ............... 375/261, 298, 260, 264; 329/304; 332/103
   See application file for complete search history.

MODULATION ORDER SPLIT TRANSMISSIONS USING A UNIFORM CONSTELLATION

CROSS REFERENCES

The present Application for Patent claims priority to U.S. Provisional Patent Application No. 62/334,975 by SUN, et al., entitled "Modulation Order Split Transmissions Using a Uniform Underlying Constellation," filed May 11, 2016, and assigned to the assignee hereof, which is expressly incorporated by reference herein for any and all purposes.

BACKGROUND

Field of the Disclosure

The following relates generally to wireless communication, and more specifically to transmissions using superposition coding to carry multiple transmission layers.

Relevant Background

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system), multi-input multi-output (MIMO) systems, and non-orthogonal multiple access (NOMA) systems. A wireless multiple-access communications system may include a number of base stations, each simultaneously supporting communication for multiple communication devices, which may be otherwise known as user equipment (UE).

CDMA, TDMA, FDMA, OFDMA, and MIMO systems may communicate with multiple UEs through the use of resource sharing and/or orthogonal transmissions. In some cases, separate communications to multiple UEs may be accomplished by strategically sharing resources or by orthogonally transmitting to the UEs over simultaneously-shared ("common") resources. For instance, a TDMA system may designate time intervals for transmissions during which a UE is scheduled to receive a transmission—e.g., the base station may transmit to a first UE in a first time interval, a second UE in a second time interval, etc. An FDMA system may simultaneously communicate with multiple UEs by sending UE-specific transmissions over corresponding frequency resources allocated to each of the UEs. The FDMA resources may include subcarriers that are separated in frequency in such a way that transmissions over one subcarrier are orthogonal with transmissions over another subcarrier.

OFDMA may utilize a combination of TDMA and FDMA techniques. CDMA systems may simultaneously transmit to each of the UEs using the same time and frequency resources, but may uniquely modulate transmissions to different UEs with an orthogonal code. The UEs may be assigned unique orthogonal codes, and may apply the orthogonal codes to received signals to identify the transmission intended for that UE. MIMO systems may also share time and frequency resources, but may uniquely modulate the transmission stream with space-time orthogonal codes, such as spatial frequency block codes (SFBC). These spatial resources may be called transmission layers, and the same or different streams of data may be transmitted over different transmission layers. For single-user MIMO (SU-MIMO), multiple transmission layers may be transmitted to the same UE, while in multiple user MIMO (MU-MIMO), multiple transmission layers may be transmitted to different UEs.

In some cases a wireless communications system may utilize non-orthogonal multiple access (NOMA) techniques to support communications with multiple UEs by sharing time and frequency resources without using orthogonal transmissions. For example, a NOMA transmission may include multiple streams of data intended for multiple UEs using common resources—e.g., at least partially overlapping time, frequency, and/or spatial resources—where the multiple streams of data are composed of subsets of streams of data, each intended for different UEs without orthogonalizing transmissions of the subsets of data streams to one another. For instance, NOMA transmissions may take advantage of the physical locations of the UEs in the wireless communication system to transmit multiple streams of data intended for multiple UE. The different streams of data may be transmitted over different transmission layers. In some cases, the base station may transmit a base-layer (BL) to a first UE that has relatively weaker geometry (e.g., lower signal-to-noise ratio (SNR) and/or located farther from the base station) using overlapping resources and an enhancement-layer (EL) to a second UE that has a relatively higher geometry (e.g., higher SNR and/or located closer to the base station). NOMA may also be referred to as multi-user superposition transmission (MUST).

The NOMA transmission layers may be multiplexed in various ways including by using different transmit power levels, hierarchical modulation, or other multiplexing techniques. Hierarchical modulation may describe a scenario in which a first modulation scheme of a BL and a second modulation scheme of an EL are combined into a joint symbol constellation. Combining the different modulation schemes may result in an inherent power split between the BL and the EL, which may be used to support separate transmissions to UEs with different geometries. In some cases, additional power splits may be obtained using different modulation schemes or by using non-uniform joint symbol constellations. However, the complexity of a de-mapper may increase to support the additional power splits and the resulting non-uniform symbol constellations, which may also increase the chip area and power consumption of the de-mapper.

SUMMARY

A combined symbol constellation may be selected from a uniform symbol constellation that is supported by a de-mapper to provide additional power split options while reducing modifications to the de-mapper. In some examples, a signal may be constructed according to a combined symbol constellation selected from a larger uniform symbol constellation based on a desired power-ratio. The signal may include a base-layer, used to communicate a first set of data, and an enhancement-layer, used to communicate a second set of data, in accordance with the selected combined symbol constellation. The signal may be received and de-mapped according to the combined symbol constellation at a de-mapper that supports a uniform symbol constellation that is larger than the combined symbol constellation.

A method of wireless communications is described. The method may include receiving a signal based on a combined symbol constellation of a uniform symbol constellation, wherein the combined symbol constellation is down-selected from the uniform symbol constellation; and de-mapping symbols of the received signal based at least in part on the combined symbol constellation to obtain a first data stream and a second data stream, wherein the first data stream is modulated according to a first modulation order and corresponds to a base-layer, and wherein the second data stream is modulated according to a second modulation order and corresponds to an enhanced-layer.

An apparatus for wireless communications is described. The apparatus may include means for receiving a signal based on a combined symbol constellation of a uniform symbol constellation, wherein the combined symbol constellation is down-selected from the uniform symbol constellation; and means for de-mapping symbols of the received signal based at least in part on the combined symbol constellation to obtain a first data stream and a second data stream, wherein the first data stream is modulated according to a first modulation order and corresponds to a base-layer, and wherein the second data stream is modulated according to a second modulation order and corresponds to an enhanced-layer.

A further apparatus for wireless communications is described. The apparatus may include a processor, memory in electronic communication with the processor, and instructions stored in the memory. The instructions may be operable to cause the processor to receive a signal based on a combined symbol constellation of a uniform symbol constellation, wherein the combined symbol constellation is down-selected from the uniform symbol constellation; and de-map symbols of the received signal based at least in part on the combined symbol constellation to obtain a first data stream and a second data stream, wherein the first data stream is modulated according to a first modulation order and corresponds to a base-layer, and wherein the second data stream is modulated according to a second modulation order and corresponds to an enhanced-layer.

A non-transitory computer readable medium for wireless communications is described. The non-transitory computer-readable medium may include instructions operable to cause a processor to receive a signal based on a combined symbol constellation of a uniform symbol constellation, wherein the combined symbol constellation is down-selected from the uniform symbol constellation; and de-map symbols of the received signal based at least in part on the combined symbol constellation to obtain a first data stream and a second data stream, wherein the first data stream is modulated according to a first modulation order and corresponds to a base-layer, and wherein the second data stream is modulated according to a second modulation order and corresponds to an enhanced-layer.

In some examples of the method, apparatus, or non-transitory computer-readable medium described above, the de-mapping comprises determining likelihood ratios for data of the first data stream and the second data stream from the symbols of the received signal based on the combined symbol constellation.

Some examples of the method, apparatus, or non-transitory computer-readable medium described above may further include processes, features, means, or instructions for decoding the second data stream based at least in part on the de-mapping.

Some examples of the method, apparatus, or non-transitory computer-readable medium described above may further include processes, features, means, or instructions for performing interference cancellation of the first data stream prior to the decoding based at least in part on the de-mapping.

Some examples of the method, apparatus, or non-transitory computer-readable medium described above may further include processes, features, means, or instructions for receiving an indication of any of: a power ratio between the base-layer and the enhancement-layer, the first modulation order, the second modulation order, a size of the uniform symbol constellation, the combined symbol constellation, the uniform symbol constellation, or any combination thereof.

In some examples of the method, apparatus, or non-transitory computer-readable medium described above, the de-mapping is performed by a fixed-bit width de-mapper that supports the uniform symbol constellation.

In some examples of the method, apparatus, or non-transitory computer-readable medium described above, the de-mapping is performed in a hardware de-mapper that suppresses mapping to points of the uniform symbol constellation not in the combined symbol constellation.

In some examples of the method, apparatus, or non-transitory computer-readable medium described above, the combined symbol constellation uses Gray code mapping.

A method of wireless communications is described. The method may include selecting a combined symbol constellation from a uniform symbol constellation based at least in part on a power ratio between a base-layer of a signal and an enhancement-layer of the signal, wherein the base-layer is associated with a first modulation order, the enhancement-layer is associated with a second modulation order, and the combined symbol constellation is down-selected from the uniform symbol constellation; mapping a first data stream and a second data stream to symbol locations of the combined symbol constellation to obtain a set of symbols for the signal, wherein the first data stream corresponds to a base-layer transmission for a first user equipment (UE) and the second data stream corresponds to an enhancement-layer transmission for a second UE; and transmitting the signal to the first UE and the second UE.

An apparatus for wireless communications is described. The apparatus may include means for selecting a combined symbol constellation from a uniform symbol constellation based at least in part on a power ratio between a base-layer of a signal and an enhancement-layer of the signal, wherein the base-layer is associated with a first modulation order, the enhancement-layer is associated with a second modulation order, and the combined symbol constellation is down-selected from the uniform symbol constellation; means for mapping a first data stream and a second data stream to symbol locations of the combined symbol constellation to obtain a set of symbols for the signal, wherein the first data stream corresponds to a base-layer transmission for a first user equipment (UE) and the second data stream corresponds to an enhancement-layer transmission for a second UE; and means for transmitting the signal to the first UE and the second UE.

A further apparatus for wireless communications is described. The apparatus may include a processor, memory in electronic communication with the processor, and instructions stored in the memory. The instructions may be operable to cause the processor to select a combined symbol constellation from a uniform symbol constellation based at least in part on a power ratio between a base-layer of a signal and an enhancement-layer of the signal, wherein the base-layer is associated with a first modulation order, the enhancement-layer is associated with a second modulation order, and the combined symbol constellation is down-selected from the uniform symbol constellation; map a first data stream and a second data stream to symbol locations of the combined symbol constellation to obtain a set of symbols for the signal, wherein the first data stream corresponds to a base-layer transmission for a first user equipment (UE) and the second data stream corresponds to an enhancement-layer transmission for a second UE; and transmit the signal to the first UE and the second UE.

A non-transitory computer readable medium for wireless communications is described. The non-transitory computer-readable medium may include instructions operable to cause a processor to select a combined symbol constellation from a uniform symbol constellation based at least in part on a power ratio between a base-layer of a signal and an enhancement-layer of the signal, wherein the base-layer is associated with a first modulation order, the enhancement-layer is associated with a second modulation order, and the combined symbol constellation is down-selected from the uniform symbol constellation; map a first data stream and a second data stream to symbol locations of the combined symbol constellation to obtain a set of symbols for the signal, wherein the first data stream corresponds to a base-layer transmission for a first user equipment (UE) and the second data stream corresponds to an enhancement-layer transmission for a second UE; and transmit the signal to the first UE and the second UE.

Some examples of the method, apparatus, or non-transitory computer-readable medium described above may further include processes, features, means, or instructions for selecting the uniform symbol constellation for transmission of the signal based at least in part on a modulation order capability of the second UE.

In some examples of the method, apparatus, or non-transitory computer-readable medium described above, the combined symbol constellation is selected based at least in part on the first modulation order, the second modulation order, or a third modulation order associated with the uniform symbol constellation, or any combination thereof.

In some examples of the method, apparatus, or non-transitory computer-readable medium described above, the third modulation order is greater than a product of the first modulation order and the second modulation order.

Some examples of the method, apparatus, or non-transitory computer-readable medium described above may further include processes, features, means, or instructions for transmitting, to at least the second UE, an indication of any of: the power ratio, the first modulation order, the second modulation order, the third modulation order, the combined symbol constellation, the uniform symbol constellation, or any combination thereof.

In some examples of the method, apparatus, or non-transitory computer-readable medium described above, the first modulation order corresponds to any of: quadrature phase shift keying (QPSK), 16-quadrature amplitude modulation (QAM), or 64-QAM and wherein the second modulation order corresponds to any of: QPSK, 16-QAM, or 64-QAM.

In some examples of the method, apparatus, or non-transitory computer-readable medium described above, the third modulation order corresponds to 64-QAM, 256-QAM, or 1024-QAM.

In some examples of the method, apparatus, or non-transitory computer-readable medium described above, the combined symbol constellation is selected from a plurality of combined symbol constellations comprised by the uniform symbol constellation that correspond to a plurality of power ratios.

In some examples of the method, apparatus, or non-transitory computer-readable medium described above, the selected combined symbol constellation uses Gray code mapping.

DETAILED DESCRIPTION

Figure 1:
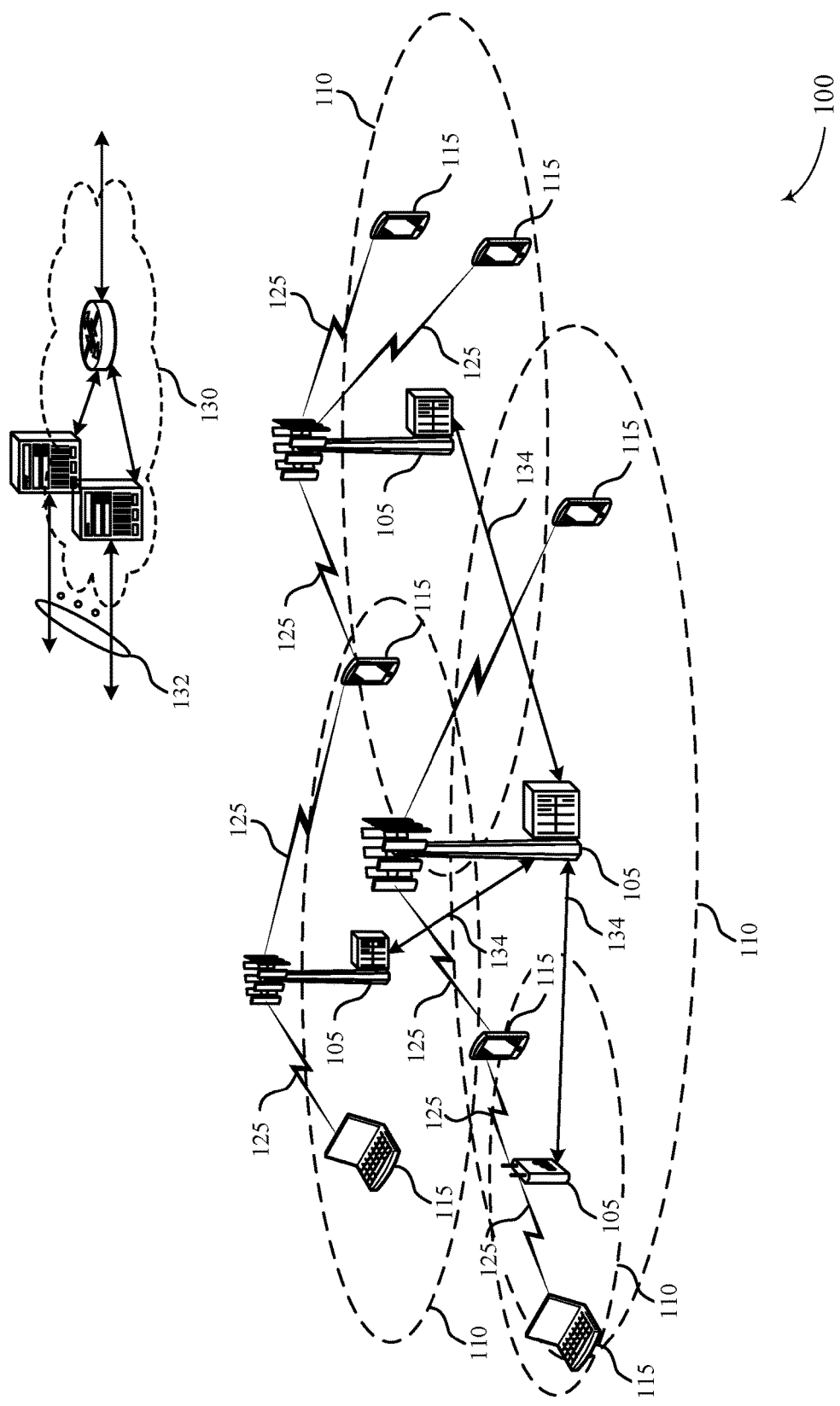
FIG. 1 illustrates an example of a system for wireless communications that supports modulation order split transmissions using a uniform constellation in accordance with aspects of the present disclosure.

Aspects of the disclosure include a combined symbol constellation for non-orthogonal transmission layers using that is down-selected from a uniform symbol constellation. In some examples, a first set of data for a first user equipment (UE) may be associated with a base-layer modulation order (e.g., 2, 4, 8, 16, etc.), while a second set of data for a second UE may be associated with an enhancement-layer modulation order (e.g., 2, 4, 8, 16, etc.). The combined symbol constellation may include an enhancement-layer symbol constellation (e.g., a QPSK, 16-QAM, 64-QAM symbol constellation, etc.) associated with the enhancement-layer modulation order that is superimposed over a base-layer symbol constellation (e.g., a QPSK, 16-QAM, 64-QAM symbol constellation, etc.) associated with the base-layer modulation order. The combined symbol constellation may be constructed by selecting a subset of symbol locations from a uniform symbol constellation that is large enough in size to support the combined symbol constellation—e.g., the uniform symbol constellation may have greater than 16 symbol locations to support a combined symbol constellation having a QSPK base-layer and a QPSK enhancement layer. Down-selecting the combined symbol constellation from the uniform symbol constellation may provide additional power split options while not increasing de-mapper complexity at the UE(s). The uniform symbol constellation may support a number of available combined symbol constellations that each correspond to different power ratios. The additional power split options may provide enhanced transmission flexibility to cover pairings of UEs in a variety of channel conditions.

By down-selecting the combined symbol constellation from a uniform symbol constellation, the EL-UE may use a fixed-bit width de-mapper, while supporting a number of different power ratios. Furthermore, the de-mapper of the EL-UE may designate each symbol location of a combined symbol constellation using a signed binary number, and by using a uniform symbol constellation, the de-mapper may use pre-determined symbol locations to mitigate an increase in the size of the signed binary number used to designate symbol locations. A BL-UE may also receive the transmission; however, the BL-UE may map the received symbols to a symbol constellation associated with the first modulation order to determine the data transmitted over the base-layer. In some cases, the BL-UE may be unaware that the combined symbol constellation is being utilized and may perceive the enhancement-layer of the transmission as noise.

Features of the disclosure introduced above are further described below in the context of a wireless communications system. Specific examples are then described of example combined symbol constellations for modulation order split transmissions using a uniform constellation. These and other features of the disclosure are further illustrated by and described with reference to apparatus diagrams, system diagrams, and flowcharts that relate to modulation order split transmissions using a uniform constellation.

FIG. 1 illustrates an example of a wireless communications system 100 that supports modulation order split transmissions using a uniform constellation in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, an MTC device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may transmit data to a UE 115 as a wireless signal. Transmitting the wireless signal may include first mapping data to symbols, which may be represented by a symbol constellation. Symbol constellations corresponding to modulation schemes (e.g., QPSK, 16-QAM, 64-QAM, 256-QAM, 1024-QAM, etc.) may be used to depict how discrete points of magnitude and phase are allocated to symbols and are assigned binary values. Symbols supported by larger symbol constellations may communicate increased numbers of data bits. As stated above, the base station 105 may map data bits intended for the UE 115 to magnitude and phase locations corresponding to respective symbols of a supported symbol constellation, creating a baseband signal. In some examples, the base station 105 may modulate the baseband signal with a carrier frequency and may transmit the resulting wireless signal to the UE 115.

The UE 115 may receive the wireless signal at the carrier frequency and may down-convert the wireless signal to remove the carrier frequency, leaving a baseband signal. The UE 115 may partition the baseband signal into symbol periods (e.g., removing any cyclic prefix) to distinguish the transmission of one symbol from another. The UE 115 may then process the signal symbol-by-symbol by determining the magnitude and phase of the signal within a symbol period and de-mapping the magnitude and phase to a corresponding symbol of the symbol constellation used to transmit the signal. The de-mapped symbols may be used to determine the data transmitted to the UE 115.

In order to de-map the received symbols, a de-mapper of the UE 115 may store values or indices that are representative of the magnitude and phase values (which may also be represented as a complex number a+jb) corresponding to each symbol of a symbol constellation (i.e., the symbol locations). For example, the de-mapper may use indices (Re, Im) to represent the magnitude and phase of a symbol. For a 64-QAM scheme, eight locations may be used to describe the real axis, which may correspond to a 4-bit signed binary number, and 8 values may be used to describe the imaginary axis, which may also correspond to a 4-bit signed binary number. For a 256-QAM scheme, the UE may use 16 values to describe the real axis, which may correspond to a 5-bit signed binary number, and 16 values may be used to describe the imaginary axis, which may correspond to a 5-bit signed binary number. In some examples, the chip area used by a de-mapper used to support a 5-bit signed binary number may be significantly larger than the de-mapper used to support a 4-bit signed binary number (e.g. up to 15% larger). This increase in chip area may be associated with supporting the parallel de-mapping of a large number of symbols. Additionally, the de-mapper that supports the 5-bit signed binary number may consume greater amounts of power.

During the de-mapping, techniques such as maximum likelihood (ML) and log-likelihood ratio (LLR) may be used to facilitate decoding of received symbols. These techniques may determine "soft" bit values corresponding to de-mapped symbols. For example, a determined bit value may be assigned a confidence level based on the likelihood that a received symbol has been correctly mapped to a symbol location. The decoder may also use recursive processing to adjust previously assigned confidence levels (e.g.

strengthen or weaken) based on subsequently received symbols. Using a larger signed binary number may additionally effect the generation of the soft bit values. For instance, a de-mapper supporting additional symbol locations may differentiate one symbol location from another with a finer resolution. Accordingly, multipliers used to determine the confidence levels (e.g., a measure of the distance of a receive symbol to a symbol location) may support binary numbers of increased size, further contributing to increases in power consumption and chip area of the de-mapper.

A wireless communications system 100 may use a combination of multiple-access techniques to support communication with the UEs 115 in the network. For instance, a base station 105 may use orthogonal multiplexing techniques (e.g., OFDM), in addition to non-orthogonal multiplexing techniques (e.g., NOMA), to send data to connected UEs 115. A non-orthogonal multiplexing scheme may differ from other multiplexing schemes in that multiple transmissions may be sent using shared resources without additional resource allocation or orthogonal signal modulation being used. In some examples, a non-orthogonal multiplexing scheme may instead use characteristics (e.g., SNR, geometry, spectral density) of the UEs 115 to differentiate transmissions intended for one UE 115 from transmissions intended for another UE 115. In some cases, a base station 105 may switch between operating modes for transmissions to a UE 115 on a dynamic basis. For instance, the base station 105 may switch between operating modes on a transmission time interval (TTI)-to-TTI basis (e.g., frame, subframe, slot, symbol period), and the selection of an operating mode for transmissions may be dependent on CSI from that UE 115 or other UEs 115 (e.g., based on a presence or absence of complementary operating modes for multiple UEs, etc.). For some systems, a TTI may be associated with a subframe period.

In one example, a base station 105 using non-orthogonal multiplexing may transmit a first transmission layer at a lower power to a first UE 115 and may transmit a second transmission layer at a higher power to a second UE 115 using at least partially overlapping physical resources. The first UE 115 (e.g., EL-UE) may apply interference cancellation techniques to at least partially cancel the higher power transmission layer to decode the lower power transmission layer. The second UE 115 (e.g., BL-UE) may decode the higher power transmission layer with the low power transmission layer perceived as noise. In some cases, this technique may be used to convey multiple data stream transmissions over the same communication resource without using different spatial layers or orthogonal codes.

In another example of non-orthogonal multiplexing, the base station 105 may combine a first modulation scheme (e.g., QPSK, 16-QAM, etc.) and a second modulation scheme (e.g., QPSK, 16-QAM, 64-QAM, etc.) to construct a combined symbol constellation, which may be used to transmit a multi-layered transmission to multiple UEs. A first transmission layer (e.g., a base-layer) of the transmission may be associated with the first modulation scheme, and a second transmission layer (e.g., an enhancement-layer) of the transmission may be associated with the second modulation scheme. The combined symbol constellation may inherently split power between the first transmission layer and the second transmission layer—e.g., so that greater power is allocated to the base-layer than the enhancement-layer. Power splits different than the inherent power split may be achieved by non-uniformly adjusting widths between symbols or groups of symbols of the first and/or second modulation scheme. However, adjusting the widths may increase the complexity of a corresponding de-mapper. That is, the corresponding de-mapper may use a higher de-mapper bit-width in order to support the different power ratios, which may result in increased chip area of the de-mapper and increased power consumption.

In some examples, a combined symbol constellation may be down-selected from a uniform symbol constellation (e.g., 64-QAM, 256-QAM, 1024-QAM, etc.). In this way, a de-mapper used for a uniform symbol constellation may also be used to support non-uniform symbol constellations having a number of different power ratios with minimal or no increase in complexity—e.g., without increasing the bit-width used to designate symbol locations of the uniform symbol constellation.

Figure 2:
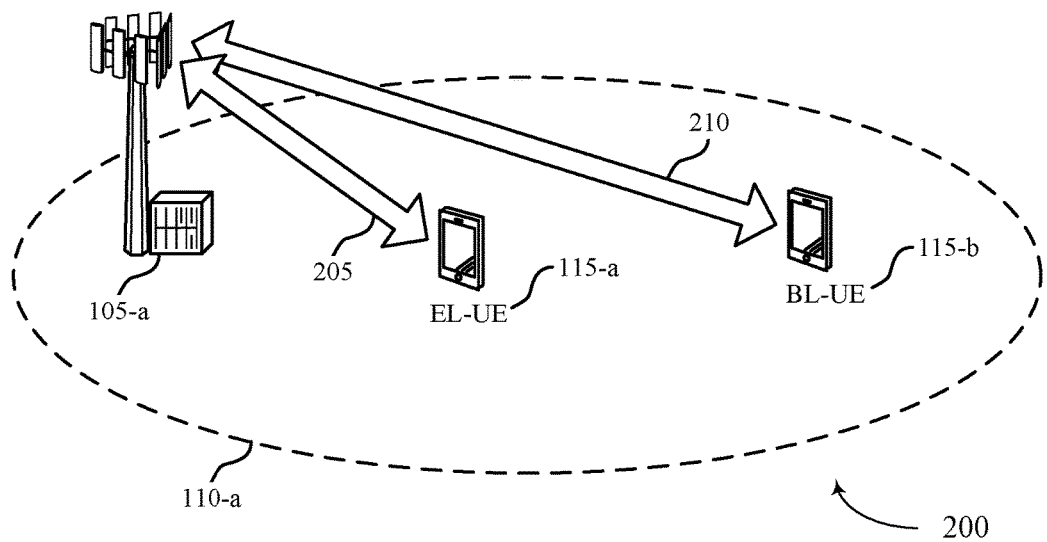
FIG. 2 illustrates an example of a wireless communications subsystem that supports modulation order split transmissions using a uniform constellation in accordance with aspects of the present disclosure.

FIG. 2 illustrates an example of a wireless communications subsystem 200 that supports modulation order split transmissions using a uniform constellation in accordance with various aspects of the present disclosure. Wireless communications subsystem 200 may include EL-UE 115-a, BL-UE 115-b, and base station 105-a which may be examples of a UE 115 or a base station 105 and may communicate with one another as described above with reference to FIG. 1. EL-UE 115-a may be capable of operating in a NOMA mode—e.g., may be configured for interference cancellation of BLs and/or NOMA-specific processing—and may be dynamically configured to operate in the NOMA mode by base station 105-a. BL-UE 115-b may be capable of operating in the NOMA mode but may not be configured, or may be a legacy UE without any NOMA-specific capabilities.

In the example of FIG. 2, base station 105-a configures EL-UE 115-a to operate in a NOMA mode (e.g., via RRC signaling, etc.) and pairs EL-UE 115-a with BL-UE 115-b. Base station 105-a may then determine a first modulation order (e.g., 2, 4, 8, 16, etc.) for transmissions to BL-UE 115-b and a second modulation order (e.g., 2, 4, 8, 16, etc.) for transmissions to EL-UE 115-a. In some cases, base station 105-a may determine the first and second modulation orders based on desired data rates and/or reliability of transmissions BL-UE 115-b and EL-UE 115-a. For instance, base station 105-a may select QPSK (modulation order 2) for transmissions to BL-UE 115-b and 16-QAM (modulation order 4) for transmissions to EL-UE 115-a. In this way, base station 105-a may transmit to EL-UE 115-a with a higher data rate than to BL-UE 115-b. In another example, base station 105-a may select QPSK for transmissions to BL-UE 115-b and QPSK for transmissions to EL-UE 115-a—e.g., to increase reliability (e.g., decrease a bit error rate (BER)) of transmissions to EL-UE 115-a. In some examples, base station 105-a may determine a combined symbol constellation based on the selected first and second modulation orders, and may use the combined symbol constellation to perform simultaneous transmissions to both EL-UE 115-a and BL-UE 115-b.

Figure 3A:
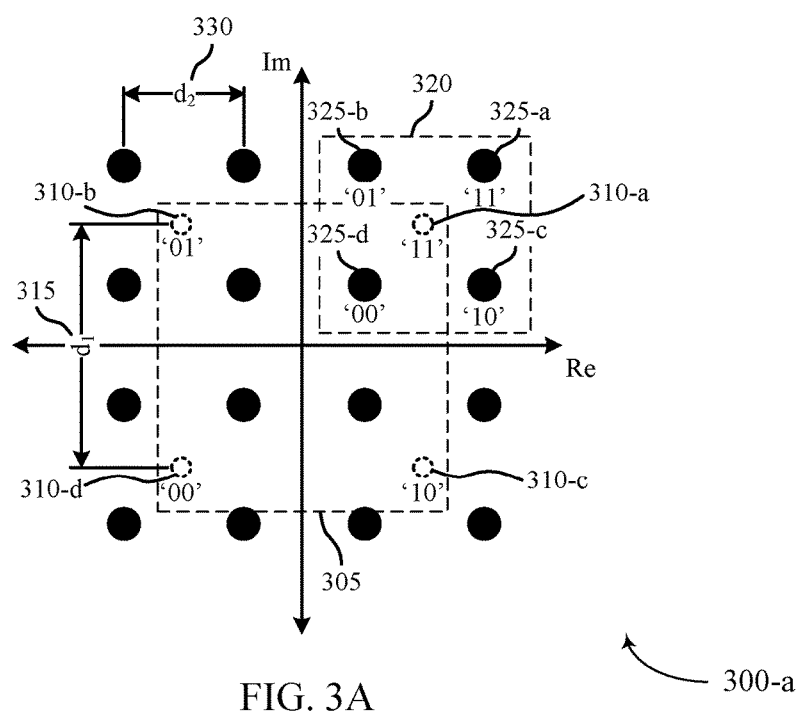
FIGS. 3A through 3C illustrate examples of combined symbol constellations in accordance with aspects of the present disclosure.

FIG. 3A illustrates an example of a combined symbol constellation 300-a, as discussed with reference to FIG. 2, in accordance with various aspects of the present disclosure. Combined symbol constellation 300-a may be a uniform symbol constellation and may include a first symbol constellation 305, constructed according to a first modulation order (e.g., QPSK, 16-QAM, 64-QAM, etc.), and a second symbol constellation 320, constructed according to a second modulation order (e.g., QPSK, 16-QAM, 64-QAM, etc.) that may be superimposed over the first symbol constellation 305.

The first symbol constellation 305 may be modulated according to a QPSK scheme and include four symbols 310-*a* through 310-*d*. The second symbol constellation 320 may also be modulated according to a QPSK scheme and include four symbols 325-*a* through 325-*d*. As depicted in FIG. 3A, the symbols 310 and 325 may be assigned binary values according to a Gray code mapping, although other mapping codes may also be used. Combined symbol constellation 300-*a* may be a uniform symbol constellation (i.e., the distance between symbols 325 ("bit width") is uniform), and the distance 315 between symbols 310 may be $d_1$, while the distance 330 between symbols 325 may be $d_2$. Combined symbol constellation 300-*a* may be used to communicate different sets of data—e.g., by using symbols 310 to communicate a first set of data and symbols 325 to communicate a second set of data—to EL-UE 115-*a* and BL-UE 115-*b*. An inherent power split may exist between transmissions associated with the symbols 310 used for the first set of data and transmissions associated with the symbols 325 used for the second set of data as a result of the construction of the combined symbol constellation 300-*a*. This inherent power split may be represented as a power ratio and may be proportional to the distances between symbols 310 relative to symbols 325.

This inherent power split may be used to separate a single transmission into multiple layers—e.g., an enhancement-layer 205 corresponding to the second set of data and a base-layer 210 corresponding to the first set of data. And may be utilized by a base station 105-*a* to perform simultaneous transmission to EL-UE 115-*a* and BL-UE 115-*b*. For instance, base station 105-*a* may use the first symbol constellation 305 to transmit a first set of data to BL-UE 115-*b* via a base-layer 210 and the second symbol constellation 320 to transmit a second set of data to EL-UE 115-*a* via enhancement-layer 205. In some examples, base-layer 210 may be associated with a higher power than enhancement-layer 205. In some examples, such as an example where the first symbol constellation 305 and the second symbol constellation 320 are both constructed according to QPSK modulation scheme, the power ratio between the power allocated to the base-layer and the power allocated to the total transmission may follow the equation:

$$P_r = 1 \bigg/ \left( \left( \frac{d_2}{d_1} \right)^2 + 1 \right).$$

In the example of FIG. 3A, combined symbol constellation 300-*a* may be a uniform symbol constellation and may use a QPSK modulation scheme for the first symbol constellation 305 and for the second symbol constellation 320. Accordingly, combined symbol constellation 300-*a* may have the following parameters: $d_1 = 2 \cdot d_2$, and $P_r = 0.8$. That is, transmission power between the transmission layers may be split so that 80% of the power for a downlink transmission is allocated to the base-layer 210, while 20% of the power is allocated to the enhancement-layer 205. Base station 105-*a* may use this power split to transmit the first set of data to the farther BL-UE 115-*b* via a base-layer 210 while simultaneously transmitting data to the nearer EL-UE 115-*a* via enhancement-layer 205.

Figure 3B:
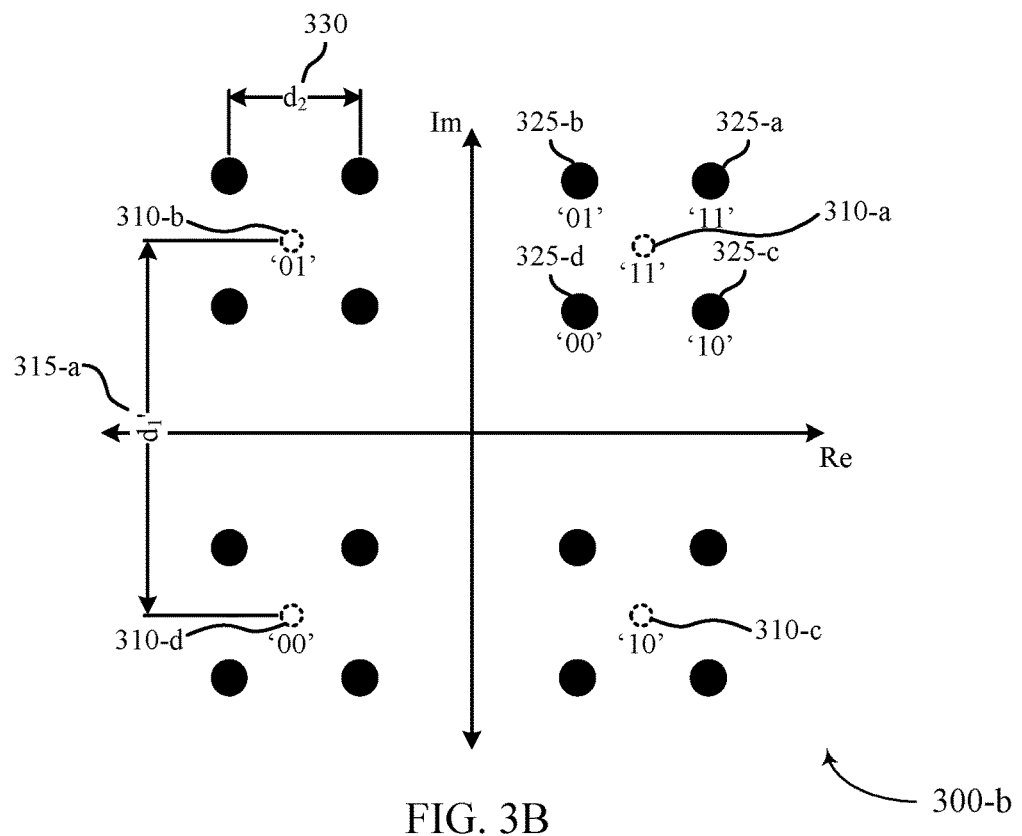
Figure 3C:
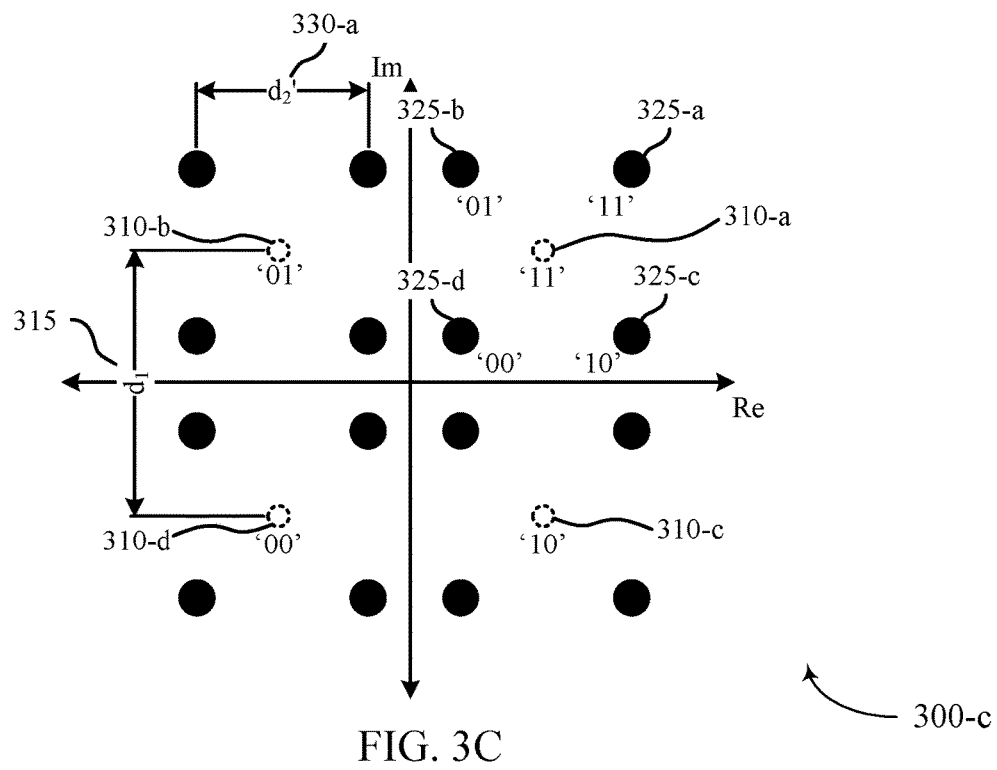

BL-UE 115-*b* may receive the downlink transmission and may perceive the lower power enhancement-layer as noise. Accordingly, BL-UE 115-*b* may de-map the received downlink transmission according to first symbol constellation 305. In some cases, BL-UE 115-*b* may be unaware that the combined symbol constellation is being used for the downlink transmission. EL-UE 115-*a*, however, may de-map the received downlink transmission according to combined symbol constellation 300-*a*. In some examples, base station 105-*a* transmits an indication of the structure of combined symbol constellation 300-*a* to EL-UE 115-*a* so that EL-UE 115-*a* may properly de-map received transmissions. As discussed above, the de-mapper of EL-UE 115-*a* may use a signed binary values to designate potential symbol locations of the combined symbol constellation 300-*a*. In the example of FIG. 3A, the de-mapper of EL-UE 115-*a* may use a 3 bit signed binary number to designate the potential symbol locations on the real axis and a 3 bit signed binary number to describe the potential symbol locations on the imaginary axis. In some examples, additional power splits may be achieved by disproportionately adjusting distances $d_1$ and $d_2$, as illustrated in FIGS. 3B and 3C, and may be used to provide base station 105-*a* with additional scheduling flexibility for transmissions to EL-UE 115-*a* and BL-UE 115-*b*. In some examples, base station 105-*a* may proportionally adjust distances $d_1$ and $d_2$ to increase the power of a transmission while maintaining a uniform structure.

FIG. 3B illustrates an example of a combined symbol constellation 300-*b* in accordance with various aspects of the present disclosure. Combined symbol constellation 300-*b* may be a non-uniform symbol constellation and may provide a different power split than that provided by combined symbol constellation 300-*a*, as described with reference to FIG. 3A. For instance, the distance 315-*a* between symbols 310 may be increased to $d_1'$ and the distance 330 between symbols 325 may be maintained at $d_2$.

In one example, combined symbol constellation 300-*a* may have the following parameters: $d_1' = 3 \cdot d_2$, and $P_r = 0.9$, which may result in more power being allocated to the base-layer 210 than in the example discussed in FIG. 3A. The base station 105-*a* may transmit a signal to EL-UE 115-*a* and BL-UE 115-*b* using combined symbol constellation 300-*b*, and EL-UE 115-*a* may use combined symbol constellation 300-*b* to de-map the received signal. In some examples, base station 105-*a* may indicate the structure of combined symbol constellation 300-*b* to EL-UE 115-*a*. Additional power ratios may similarly be obtained for combined symbol constellation 300-*b* by continuing to adjust (e.g., increase/decrease) the distance 315-*a*. However, in order to support a large number of power splits and as the distances 315 and 330 are adjusted, the de-mapper may have to distinguish between an expansive number of potential symbol locations (e.g., (3.1, 1.1); (3.5, 1.5), etc.) on the real and imaginary axes. Accordingly, the de-mapper may use a larger signed binary number to convey the possible symbol locations, which may substantially increase the chip area of the de-mapper, along with increasing power consumption.

In other examples, the combined symbol constellation may be selected from an underlying symbol constellation. The underlying symbol constellation may be a uniform symbol constellation, such that symbol locations of the underlying constellation are uniformly distributed across the real and imaginary axes. The combined symbol constellation 300-*b* may then be selected from the known symbol locations of the uniform symbol constellation. For instance, symbols 325-*a* through 325-*d* may located at symbol locations {(2,2); (2,4); (4,2); (4,4)} of a uniform symbol constellation, and symbol 310-*a* may correspond to symbol location (3,3) of the uniform symbol constellation. In this way, a device may support a number of different combined symbol constellations while utilizing a fixed bit-width de-mapper that corresponds to known symbol locations of a uniform symbol constellation, in contrast to selecting a de-mapper that is large enough to support a desired number of possible/unknown symbol locations.

FIG. 3C illustrates an example of a combined symbol constellation 300-c in accordance with various aspects of the present disclosure. Combined symbol constellation 300-c may be a non-uniform symbol constellation and may provide a different power split than that provided by combined symbol constellation 300-a through 300-b, as described with reference to FIGS. 3A-3B.

In one example, the distance 330-a between symbols 325 may be increased to $d_2'$ and the distance 315 between symbols 310 may be maintained at $d_1$. In one example, combined symbol constellation 300-c may have the following parameters: $d_1=2$, $d_2'=1.5$, and $P_r=0.64$, which may result in more power being allocated to the enhancement-layer 205 than in the example discussed in FIG. 3A. The base station 105-a may transmit a signal to EL-UE 115-a and BL-UE 115-b using combined symbol constellation 300-c, and EL-UE 115-a may use combined symbol constellation 300-c to de-map the received signal. However, similar to the example discussed in FIG. 3B, in order to support a large number of power splits selected from undetermined symbol locations, the de-mapper may have to distinguish between an increased number of potential symbol locations on the real and imaginary axes. In combination with the power splits supported for FIG. 3B, the de-mapper may use a significantly larger signed binary number (e.g., 6, 7, 8-bit, etc.) and the size of the de-mapper may proportionally increase.

Figure 3D:
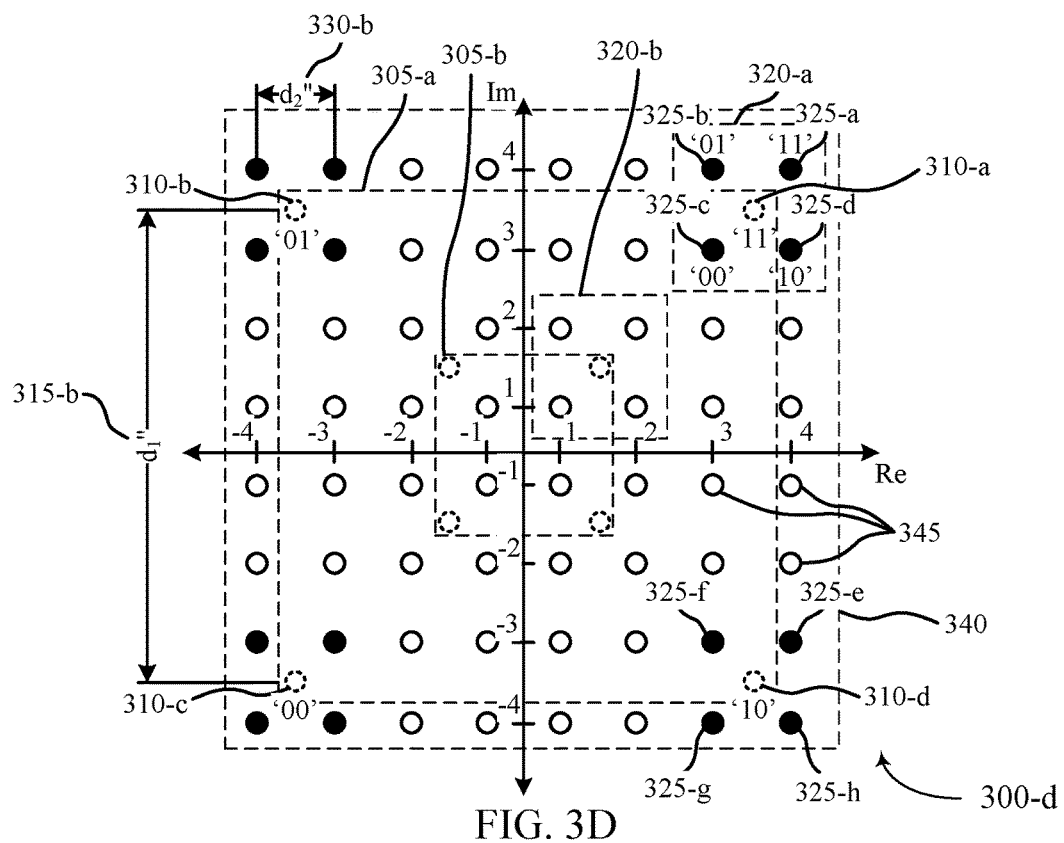
FIGS. 3D and 3E illustrate examples of combined symbol constellations that support modulation order split transmissions using a uniform constellation in accordance with aspects of the present disclosure.

FIG. 3D illustrates an example of a combined symbol constellation 300-d that supports modulation order split transmissions using a uniform constellation in accordance with various aspects of the present disclosure. Combined symbol constellation 300-d may be a non-uniform symbol constellation and may provide a different power split than that provided by combined symbol constellations 300-a through 300-c, as described with reference to FIGS. 3A-3C.

Combined symbol constellation 300-d may be selected, (e.g., down-selected) from a uniform symbol constellation 340 that includes symbol locations 345. The symbol locations 345 in the uniform symbol constellation 340 may be designated using (Re, Im) indices. Uniform symbol constellation 340 may be constructed as any fixed-bit width symbol constellation. For instance, the indices for uniform symbol constellation 340 may map to symbol constellations such as a 16-QAM, 64-QAM, 128-QAM, etc. If the uniform symbol constellation is constructed using indices that map to a legacy 64-QAM constellation, then the distance between an index value of 0 and an index value of 1 on the Re or Im axes may be different than the distance between an index value of 1 and an index value of 2. For example, the difference between indexes 1 and 2 (or 2 and 3, or 3 and 4) may be twice the distance between indexes 0 and 1 as shown in FIG. 3D. Alternatively, the indices for uniform symbol constellation 340 may be equidistant from each other. For instance, uniform symbol constellation may be constructed so that the distance between indexes 0 and 1 on the Re and Im axes is the same as the distance between indexes 1 and 2 (or 2 and 3, or 3 and 4). In that case, a uniform symbol constellation may have indices −7, −6, −5, −4, −3, −2, −1, 0, 1, 2, 3, 4, 5, 6, 7 on the Re and Im axes, while a legacy 64-QAM constellation would map to indices −7, −5, −3, −1, 1, 3, 5, and 7 on each of the Re and Im axes.

In some cases, combined symbol constellation 300-d may be selected to include first symbol constellation 305-a and second symbol constellation 320-a, which corresponds to a QPSK base-layer and a QPSK enhancement-layer. The power ratio $P_r$ for the combined symbol constellation 300-d may be determined by the symbol distances $d_1''$ 315-b and $d_2''$ 330-b. In this example, combined symbol constellation 300-d may have the following parameters: $d_1''=6 \cdot d_2''$, $P_r=0.972$. The symbol locations included in the combined symbol constellation 300-d may be designated by a set of indices, (3,4), which corresponds to symbol locations {(3,3), (3,4), (4,3), (4,4); (−3,3), (−3,4), (−4,3), (−4,4); (−3,−3), (−3,−4), (−4,−3), (−4,−4); (3,−3), (3,−4), (4,−3), (4,−4)}. Other combined symbol constellations may be chosen to achieve different power splits by selecting different symbol locations 345 to yield a different combined symbol constellation. For instance, symbol locations 345 may be selected so that the combined symbol constellation 300-d includes first symbol constellation 305-b and second symbol constellation 320-b, which has the following parameters $d_1''=2 \cdot d_2''$, $P_r=0.8$. By selecting different symbol locations 345 of the uniform symbol constellation 340, a de-mapper may support multiple power splits while utilizing a fixed number of symbol locations. Accordingly, a fixed-bit width de-mapper (e.g., a de-mapper that supports a uniform constellation, such as 64-QAM or 256-QAM) may be used while the number of bits used for designating symbols locations of a combined symbol constellation 300 may be equivalent to the number of bits used to designate symbol locations of the uniform constellation 340, preserving chip area and power consumption.

In some examples, base station 105-a may transmit different sets of data to EL-UE 115-a and BL-UE 115-b using symbols 325 of combined symbol constellation 300-d. For instance, BL-UE 115-b may de-map received symbols 325 according to first symbol constellation 305-a (e.g., each received symbol may be de-mapped to one of symbols 310-a, 310-b, 310-c and 310-d) to determine a first set of data, while EL-UE 115-a may de-map received symbols 325 according to combined symbol constellation 300-d to determine a second set of data using the relative locations of the symbols within the second constellation 320-d for de-mapping to data bits of the second set of data. For example, EL-UE 115-a may map symbols 325-a to 325-d received at a first set of symbol locations 345 to a same set of output bits as symbols 325-e to 325-h received at a different set of symbol locations 345, respectively. In some cases, base station 105-a may also transmit an indication to EL-UE 115-a of which symbol locations 345 have been selected (e.g., symbols 325) for a combined symbol constellation. EL-UE 115-a may suppress unused symbol locations and may de-map the received symbols according to the remaining symbol locations.

Figure 3E:
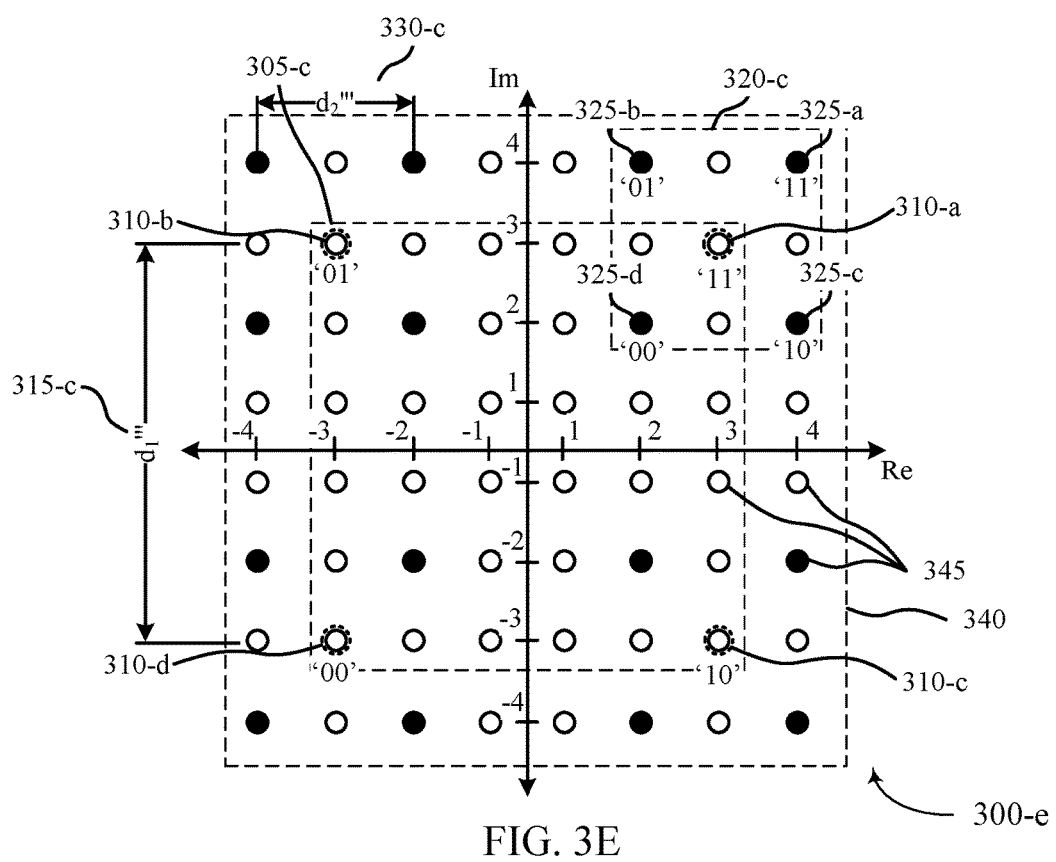

FIG. 3E illustrates an example of a combined symbol constellation 300-e that supports modulation order split transmissions using a uniform constellation in accordance with various aspects of the present disclosure. Combined symbol constellation 300-e may be a non-uniform symbol constellation and may provide a different power split than that provided by combined symbol constellation 300-a through 300-d, as described with reference to FIGS. 3A-3D.

Combined symbol constellation 300-e may be similarly selected from a uniform symbol constellation 340 that includes symbol locations 345. As above, uniform symbol constellation 340 may be any fixed-bit width constellation (e.g., 64-QAM, 128-QAM). In some cases, combined symbol constellation 300-e may be selected to yield first symbol constellation 305-c and second symbol constellation 320-c. In one example, uniform symbol constellation 340 is a legacy 64-QAM symbol constellation, and combined symbol constellation has the following parameters: $d_1'''=5$, $d_2'''=2$, and $P_r=0.862$. The selection of the symbol locations may be designated using the indices (2,4), which corresponds to symbol locations {(2,2), (2,4), (4,2), (4,4); (−2,2), (−2,4), (−4,2), (−4,4); (2,−2), (2,−4), (4,−2), (4,−4); (−2,−2), (−2,−4), (−4,−2), (−4,−4)} being used by combined symbol constellation 300-e.

As illustrated by FIGS. 3D and 3E, a uniform symbol constellation 340 may support a number of different combined symbol constellations 300, which may each correspond to a unique power ratio. For a uniform 64-QAM symbol constellation 340, for example, a combined symbol constellation 300 that uses a first QPSK symbol constellation 305 and a second QPSK symbol constellation 320 may have a baseline power split of 0.8 and may obtain the following power splits.

TABLE 1

| Combined Symbol Constellation Indices | Power Split |
| --- | --- |
| (1, 3) | .69 |
| (1, 4) | .64 |
| (2, 4) | .862 |
| (2, 3) | .94 |
| (3, 4) | .973 |

When both symbol constellations 305 and 320 are QPSK, the baseline power split may be determined when the 16 symbol locations 345 closest to the origin are selected, or in this example when $d_1'''=2$ and $d_2'''=1$.

Although FIGS. 3D and 3E have been generally discussed in the context of a uniform symbol constellation 340 that is associated with a 64-QAM scheme, uniform symbol constellation may also be discussed in the context of a uniform symbol constellation associated with a 256-QAM or a 1024-QAM constellation scheme. A 256-QAM uniform symbol constellation 340 may support a first symbol constellation 305 that is associated with a QPSK or 16-QAM scheme and a second symbol constellation 320 that is associated with a QPSK or 16-QAM scheme. A 1024-QAM uniform symbol constellation 340 may support a first symbol constellation 305 that is associated with a QPSK, 16-QAM, or 64-QAM scheme and a second symbol constellation 320 that is associated with a QPSK, 16-QAM, or 64-QAM scheme. For a 256-QAM uniform symbol constellation 340, for example, a combined symbol constellation that uses a QPSK first symbol constellation 305, and a 16-QAM second symbol constellation 320, may have a baseline power split of 0.762 and the following power splits:

TABLE 2

| Combined Symbol Constellation Indices | Power Split |
| --- | --- |
| (1, 3, 5, 7) | .71 |
| (2, 4, 6, 8) | .802 |
| (2, 3, 4, 5) | .878 |
| (3, 4, 5, 6) | .923 |
| (4, 5, 6, 7) | .952 |
| (5, 6, 7, 8) | .966 |

Note that symbol locations 5 through 8 are not shown in FIG. 3E.

Figure 4:
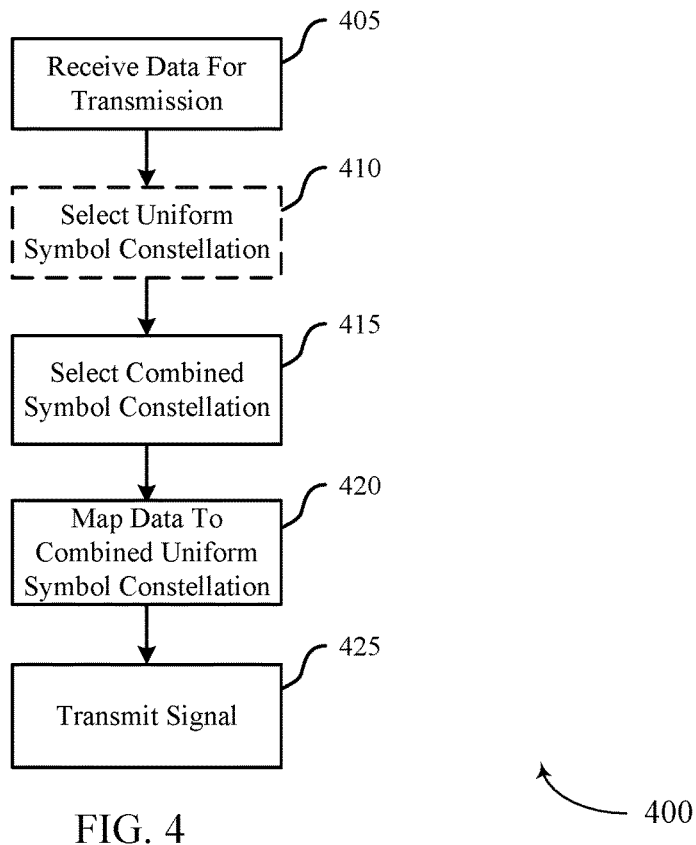
FIGS. 4 and 5 illustrate example flow charts for modulation order split transmissions using a uniform constellation in accordance with aspects of the present disclosure.

FIG. 4 illustrates an example of a flow chart 400 for modulation order split transmissions using a uniform constellation in accordance with various aspects of the present disclosure. Aspects of flow chart 400 may be performed by a base station 105 or a wireless device 1205 as described above with reference to FIGS. 1, 2, and 12. In some examples, a base station may down-select a combined symbol constellation from a uniform symbol constellation and map a first and second data stream to the combined symbol constellation for transmission.

At step 405, a base station may identify a first data stream intended for transmission to a first UE (e.g., a BL-UE) and a second data stream for a second UE (e.g., an EL-UE). The base station may determine that the first data stream is to be transmitted in a base-layer of a transmission according to a first modulation order (e.g., 2, 4, 8, 16, etc.), and that the second data stream is to be transmitted in an enhancement-layer according to a second modulation order (e.g., 2, 4, 8, 16, etc.). In some cases, the first and second modulation orders are selected based on channel conditions (e.g., lower modulation orders are selected for relatively poorer channel conditions), based on quality of service parameters for a data stream (e.g., based on guaranteed bit rates, bit error rates, etc.), and/or based on capabilities of an intended UE. The modulation orders may correspond to the number of bits communicated a symbol of a modulation scheme, for instance a modulation order of 2 may correspond to QPSK, a modulation of 4 may correspond to 16-QAM, etc.

At step 410, the base station may select a uniform symbol constellation, such as a uniform 64-QAM scheme, a 256-QAM scheme, or a 1024-QAM scheme. Although the uniform symbol constellation is not limited to existing schemes, and may choose any uniform scheme that maintains fixed distances between symbol locations. The size of the uniform symbol constellation is selected to be greater than a product of the first and second modulation orders. In some cases, the uniform symbol constellation may be selected based on a modulation order capability of the EL-UE. For example, the base station may select a 64-QAM scheme if a de-mapper of the EL-UE is capable of receiving according to 64-QAM.

At step 415, the base station may select a combined symbol constellation from the selected uniform symbol constellation. The combined symbol constellation may be down-selected from the uniform symbol constellation, for example, as described with reference to FIGS. 3D and 3E. In some examples, the combined symbol constellation is selected based on the modulation orders associated with the first and second data streams. The base station may select from a number of available combined symbol constellation encompassed by the uniform symbol constellation. In some examples, the combined symbol constellation and/or the uniform symbol constellation are selected based on the first and second modulation orders and the size of the uniform symbol constellation. The base station may apply a gray code mapping to the selected symbols of the uniform symbol constellation.

The base station may additionally select the combined symbol constellation based on a desired power ratio between the base-layer and the enhancement-layer. For instance, the base station may select a combined symbol constellation that will provide increased power to the base-layer—e.g., if the BL-UE is experiencing poor channel conditions or has moved farther from the base station. In another example, the base station may select a combined symbol constellation that will provide increased power to the enhancement-layer—e.g., if the BL-UE has moved closer to the base station or if the EL-UE is experiencing relatively poorer channel conditions.

In some examples, a combined symbol constellation may be associated with a value used to indicate that the combined symbol constellation is being used. For instance, a unique value may be designated to each available combined symbol constellation and may be communicated to a receiving UE with or prior to transmission using the combined symbol constellation. In some cases, a bitmap is used to convey the available combined symbol constellations. For instance, each bit of the bitmap may be assigned to an available combined symbol constellation. In some cases, by setting a bit of the bitmap to a '1,' a combined symbol constellation selected for a subsequent transmission may be communicated to the receiving UE. In some cases, the base station transmits an indication of any of: the power ratio, the first modulation order, the second modulation order, the size of the uniform symbol constellation, indices associated with the combined symbol constellation, the uniform symbol constellation, or any combination thereof. In some examples, the combined symbol constellation may be semi-statically configured by the base station, and the base station may indicate the combined symbol constellation in an initial message configuring the EL-UE to operate in a NOMA mode.

At step 420, the base station may map the first and second data streams to the symbol locations of the selected combined symbol constellation. At step 425, the base station may transmit a signal according to the mapped symbols to the BL-UE and the EL-UE, and may communicate a first set of data to the BL-UE in a base-layer of the signal and a second set of data to the EL-UE in an enhancement-layer of the signal.

Figure 5:
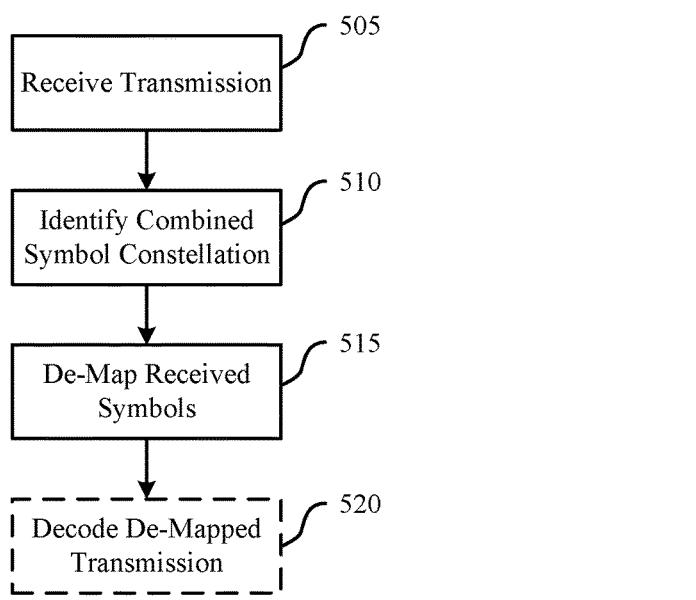

FIG. 5 illustrates an example of a flow chart 500 for modulation order split transmissions using a uniform constellation in accordance with various aspects of the present disclosure. Aspects of flow chart 500 may be performed by a UE or a wireless device 905, as described above with reference to FIGS. 1, 2, and 9. In some examples, a UE may de-map symbols of a received signal according to a combined symbol constellation that has been down-selected from a uniform symbol constellation.

At step 505, an EL-UE may receive a signal that includes a base-layer and an enhancement-layer. The base-layer may contain a first set of data intended for a BL-UE and may be modulated according to a first modulation order (e.g., 2, 4, 8, 16, etc.), and the enhancement-layer may contain a second set of data intended for an EL-UE and may be modulated according to a second modulation order (e.g., 2, 4, 8, 16, etc.). Furthermore, the signal may be transmitted in accordance with a combined symbol constellation that is down-selected from a uniform symbol constellation. In some cases, the receive chain of the EL-UE includes a de-mapper, such as a fixed-bit width de-mapper, that supports a modulation scheme with a uniform symbol constellation (e.g., QPSK, 16-QAM, 64-QAM, 256-QAM, 1024-QAM, or another fixed-bit width scheme). For example, the de-mapper of the EL-UE may support a 64-QAM symbol constellation, such as the uniform symbol constellation 340 as described with reference to FIG. 3E.

In some cases, the EL-UE may receive an indication of a structure of the combined symbol constellation type. For instance, the indication may indicate which symbols of the uniform symbol constellation have been selected for the combined symbol constellation and are used to transmit the signal. In some examples, the indicator may include any of: a power ratio between the base-layer and the enhancement-layer, the first modulation order, the second modulation order, a size of the uniform symbol constellation, indices associated with the combined symbol constellation, the uniform symbol constellation, or any combination thereof.

At step 510, the EL-UE may identify a combined symbol constellation associated with the transmission of the signal. For instance, the EL-UE may determine the structure of the combined symbol constellation based on the received indicator. In some cases, the EL-UE may use all or a portion of the above indications to determine the combined symbol constellation used for transmitting the signal. In some cases, the EL-UE determines that the combined symbol constellation uses Gray code mapping.

At step 515, the de-mapper of the EL-UE may de-map portions of the signal, corresponding to symbols of the received signal, according to the identified combined symbol constellation. In some examples, the de-mapper may support the uniform symbol constellation used to construct the combined symbol constellation and may suppress symbol locations of the uniform symbol constellation not included in the combined symbol constellation—e.g., based on the received indication or configuration. In some cases, the de-mapper is a fixed-bit width de-mapper. The de-mapper may then determine likelihood ratios for the second set of data based on the de-mapping of the received symbols to the symbols of the combined symbol constellation. In some cases, the de-mapper may use maximum likelihood (ML) or log-likelihood ratio (LLR) methods in determining which symbol of the uniform symbol constellation corresponds to a received symbol.

At step 520, the EL-UE may decode the second set of data using the de-mapped symbols. In some examples, the EL-UE may perform interference cancellation of the first data stream prior to decoding the second set of data. For instance, in some examples, the EL-UE may feedback the output from decoding the base-layer to the de-mapper when de-mapping the soft inputs (e.g., ML or LLR) for the enhancement-layer.

Figure 6:
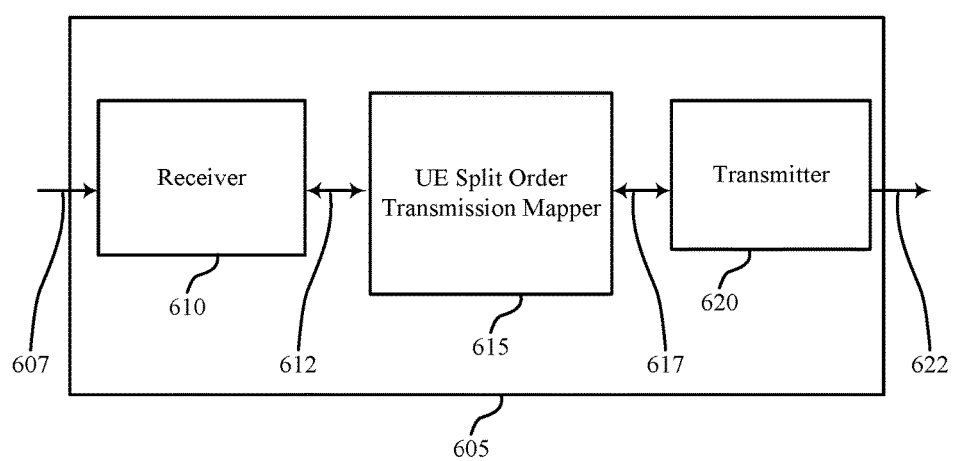
FIGS. 6 through 8 show block diagrams of a wireless device that supports modulation order split transmissions using a uniform constellation in accordance with aspects of the present disclosure.

FIG. 6 shows a block diagram 600 of a wireless device 605 that supports modulation order split transmissions using a uniform constellation in accordance with various aspects of the present disclosure. Wireless device 605 may be an example of aspects of a UE 115 as described with reference to FIGS. 1 and 2. Wireless device 605 may include receiver 610, UE split order transmission mapper 615, and transmitter 620. Wireless device 605 may also include a processor. Each of these components may be in communication with one another (e.g., via one or more buses).

The receiver 610 may receive information such as packets, user data, or control information associated with various information channels (e.g., control channels, data channels, and information related to modulation order split transmissions using a uniform constellation, etc.) in signals 607. This information may be passed on to other components of the device. The receiver 610 may be an example of aspects of the transceiver 940 described with reference to FIG. 9.

The UE split order transmission mapper 615 may receive a signal 612, which may be a representation of signal 607, based on a combined symbol constellation of a uniform symbol constellation, wherein the combined symbol constellation is down-selected from the uniform symbol constellation; and de-mapping symbols of the received signal based at least in part on the combined symbol constellation to obtain a first data stream and a second data stream, wherein the first data stream is modulated according to a first modulation order and corresponds to a base-layer, and wherein the second data stream is modulated according to a second modulation order and corresponds to an enhanced-layer. In some cases, the UE split order transmission mapper may pass information 617 to transmitter 620. The UE split order transmission mapper 615 may be an example of aspects of the UE split order transmission mapper 915 described with reference to FIG. 9.

The transmitter 620 may transmit signals 622 generated by other components of the device. In some examples, the transmitter 620 may be collocated with a receiver 610 in a transceiver module. For example, the transmitter 620 may be an example of aspects of the transceiver 940 described with reference to FIG. 9. The transmitter 620 may include a single antenna, or it may include a set of antennas.

Figure 7:
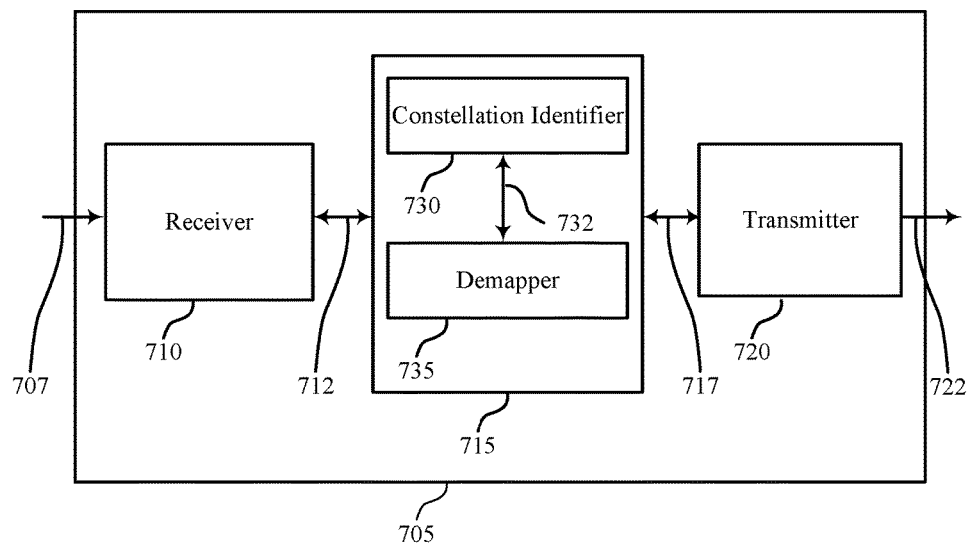

FIG. 7 shows a block diagram 700 of a wireless device 705 that supports modulation order split transmissions using a uniform constellation in accordance with various aspects of the present disclosure. Wireless device 705 may be an example of aspects of a wireless device 605 or a UE 115 as described with reference to FIGS. 1, 2 and 6. Wireless device 705 may include receiver 710, UE split order transmission mapper 715, and transmitter 720, which may be examples of a receiver 610, UE split order transmission mapper 615, and transmitter 620, as described with reference to FIG. 6. Wireless device 705 may also include a processor. Each of these components may be in communication with one another (e.g., via one or more buses).

The UE split order transmission mapper 715 may also include constellation identifier 730 and de-mapper 735. The UE split order transmission mapper 715 may be an example of aspects of the UE split order transmission mapper 915 described with reference to FIG. 9.

The receiver 710 may receive information such as packets, user data, or control information associated with various information channels (e.g., control channels, data channels, and information related to modulation order split transmissions using a uniform constellation, etc.) as a signal 707. This information may be passed on to other components of the device. The receiver 710 may be an example of aspects of the transceiver 940 described with reference to FIG. 9. In some examples, the receiver 710 may receive a signal 707 including a base-layer and an enhancement-layer, where the base-layer includes a first data stream modulated according to a first modulation order and the enhancement-layer includes a second data stream modulated according to a second modulation order. Receiver 710 may pass along signal 707, or a representation of signal 707 (e.g., filtered, digitized, etc.), in signal 712 to UE split order transmission mapper 715.

The constellation identifier 730 may identify a combined symbol constellation of a uniform symbol constellation, where the combined symbol constellation is down-selected from the uniform symbol constellation and receive an indication of any of: a power ratio between the base-layer and the enhancement-layer, the first modulation order, the second modulation order, a size of the uniform symbol constellation, the combined symbol constellation, the uniform symbol constellation, or any combination thereof. In some cases, the combined symbol constellation uses Gray code mapping. In some cases, the symbol constellation and other indications are indicated to constellation identifier 730 in signal 712. Constellation identifier 730 may pass along an indication 732 of a combined symbol constellation to de-mapper 735.

The de-mapper 735 may de-map symbols of the received signal based on the combined symbol constellation to obtain the first data stream and the second data stream. In some cases, the de-mapping includes determining likelihood ratios for data of the first data stream and the second data stream from the symbols of the received signal based on the combined symbol constellation. In some cases, the de-mapping is performed by a fixed-bit width de-mapper that supports the uniform symbol constellation. In some cases, the de-mapping is performed in a hardware de-mapper that suppresses mapping to points of the uniform symbol constellation not in the combined symbol constellation. The de-mapper 735 may use indication 732 to determine the combined symbol constellation (e.g., based on an explicit indication or based on an indication of the power ratio and modulation schemes of the overlay base and enhancement-layers.

The transmitter 720 may transmit signals 722 generated by other components of the device. For instance, UE split order transmission mapper 715 may pass information 717 to transmitter 720. In some examples, the transmitter 720 may be collocated with a receiver 710 in a transceiver module. For example, the transmitter 720 may be an example of aspects of the transceiver 940 described with reference to FIG. 9. The transmitter 720 may include a single antenna, or it may include a set of antennas.

Figure 8:
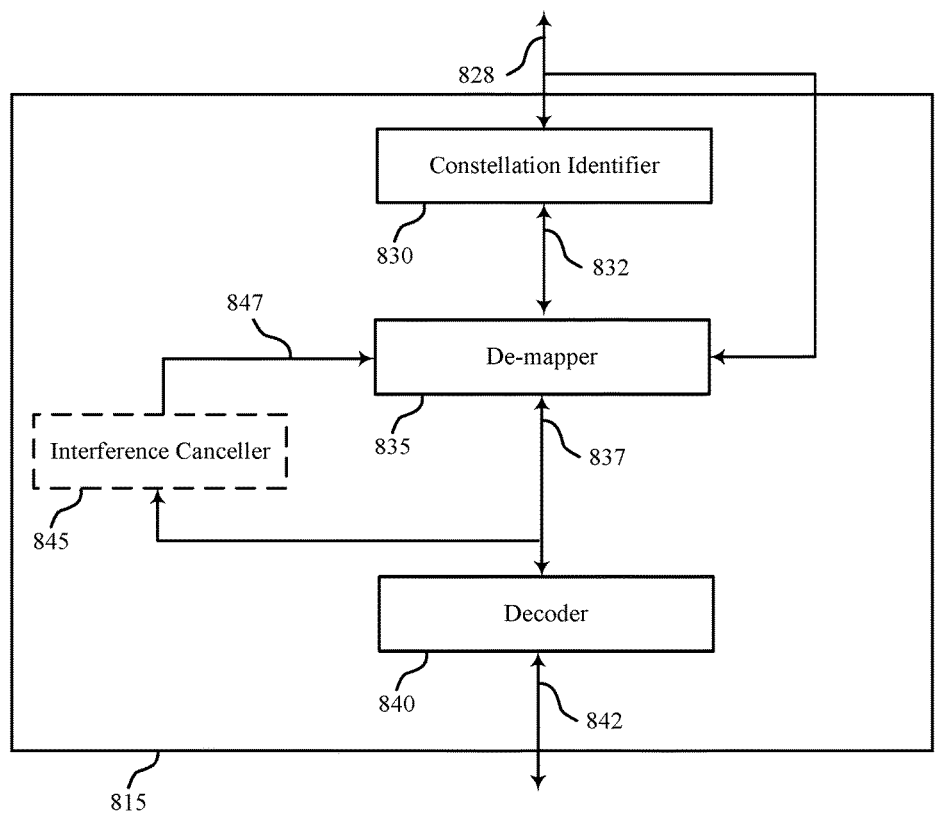

FIG. 8 shows a block diagram 800 of a UE split order transmission mapper 815 that supports modulation order split transmissions using a uniform constellation in accordance with various aspects of the present disclosure. The UE split order transmission mapper 815 may be an example of aspects of a UE split order transmission mapper 615, a UE split order transmission mapper 715, or a UE split order transmission mapper 915 described with reference to FIGS. 6, 7, and 9.

The UE split order transmission mapper 815 may include interference canceller 845 and decoder 840. The UE split order transmission mapper 815 may also include constellation identifier 830 and de-mapper 835, which may be examples of constellation identifier 730 and de-mapper 735. FIG. 7. Each of these modules may communicate, directly or indirectly, with one another (e.g., via one or more buses).

Constellation identifier 830 may receive information 828 from a receiver (e.g., receiver 610 or 710. Information 828 may include control and/or data signals. Constellation identifier 830 may decode, with or without the assistance of de-mapper 835 and decoder 840, control signals that indicate a combined symbol constellation used for following transmissions. Constellation identifier 830 may pass to de-mapper 835 information 832 indicating a combined symbol constellation (e.g., power ratios, modulation orders, or indices describing a combined symbol constellation). De-mapper 835 may use information 832 when de-mapping symbols received in a second data stream of subsequent transmissions. De-mapper 835 may pass the de-mapped symbols 837 to decoder. The decoder 840 may decode the second data stream using the de-mapped symbols 837. For instance, the decoder 840 may determine binary representations 842 of de-mapped symbols and may pass the binary representations 842 to other components in the device. In some cases, the interference 20 canceller 845 may perform interference cancellation of the first data stream prior to the decoding based on the de-mapping. For instance, interference canceller 845 may process de-mapped symbols and determine feedback information 847 (e.g., LLRs, ML, etc.) used to refine later de-mapping.

Figure 9:
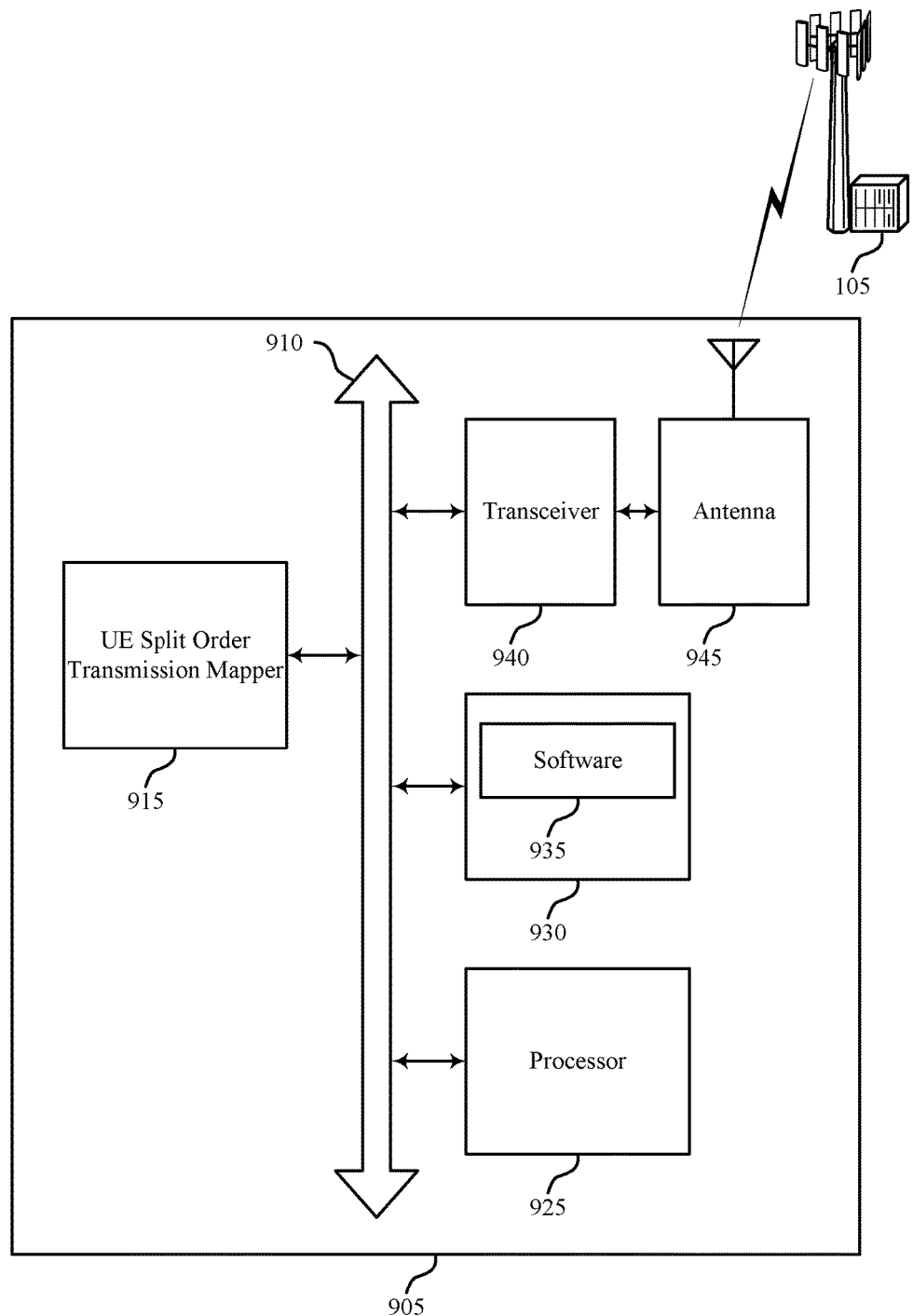
FIG. 9 illustrates a block diagram of a system including a UE that supports modulation order split transmissions using a uniform constellation in accordance with aspects of the present disclosure.

FIG. 9 shows a diagram of a system 900 including a wireless device 905 that supports modulation order split transmissions using a uniform constellation in accordance with various aspects of the present disclosure. Wireless device 905 may be an example of a wireless device 605, wireless device 705, or a UE 115 as described above, e.g., with reference to FIGS. 1, 2, 6 and 7.

Wireless device 905 may include components for bi-directional voice and data communications including components for transmitting and receiving communications, including UE split order transmission mapper 915, processor 925, memory 930, software 935, transceiver 940, and antenna 945. UE split order transmission mapper 915 may be an example of a UE split order transmission mapper 615, UE split order transmission mapper 715, or UE split order transmission mapper 815, as described with reference to FIGS. 6, 7, and 8. Each of these components may communicate with one another via bus 910.

The processor 925 may include an intelligent hardware device, (e.g., a central processing unit (CPU), a microcontroller, an application specific integrated circuit (ASIC), etc.)

The memory 930 may include random access memory (RAM) and read only memory (ROM). The memory 930 may store computer-readable, computer-executable software 935 including instructions that, when executed, cause the processor to perform various functions described herein. In some cases, the memory 930 can contain, among other things, a Basic Input-Output system (BIOS) which may control basic hardware and/or software operation such as the interaction with peripheral components or devices.

Software 935 may include code to implement aspects of the present disclosure, including code to support modulation order split transmissions using a uniform constellation. Software 935 can be stored in a non-transitory computer-readable medium such as system memory or other memory. In some cases, the software 935 may not be directly executable by the processor but may cause a computer (e.g., when compiled and executed) to perform functions described herein.

The transceiver 940 may communicate bi-directionally, via one or more antennas, wired, or wireless links as described above. For example, the transceiver 940 may represent a wireless transceiver and may communicate bi-directionally with another wireless transceiver. The transceiver 940 may also include a modem to modulate the packets and provide the modulated packets to the antennas for transmission, and to demodulate packets received from the antennas.

In some cases, the wireless device may include a single antenna 945. However, in some cases the device may have more than one antenna 945, which may be capable of concurrently transmitting or receiving multiple wireless transmissions.

Figure 10:
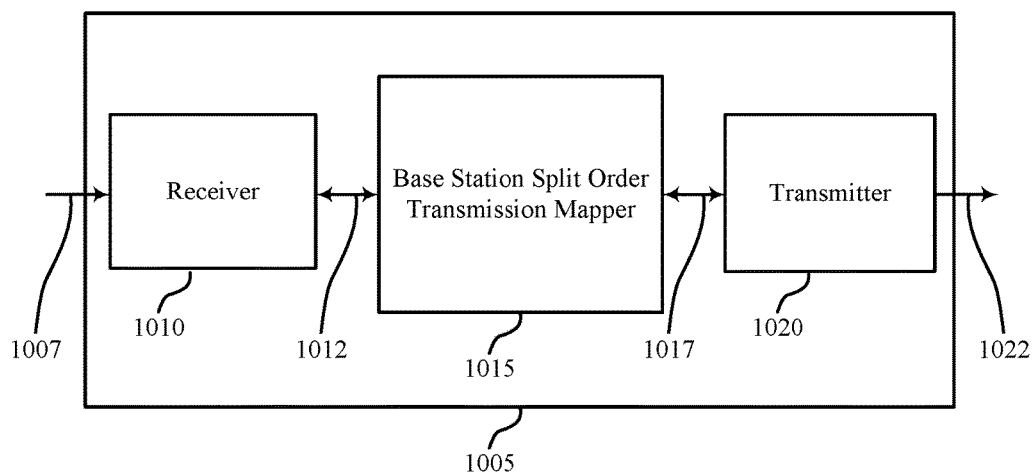
FIGS. 10 and 11 show block diagrams of a wireless device that supports modulation order split transmissions using a uniform constellation in accordance with aspects of the present disclosure.

FIG. 10 shows a block diagram 1000 of a wireless device 1005 that supports modulation order split transmissions using a uniform constellation in accordance with various aspects of the present disclosure. Wireless device 1005 may be an example of aspects of a base station 105 as described with reference to FIGS. 1 and 2. Wireless device 1005 may include receiver 1010, base station split order transmission mapper 1015, and transmitter 1020. Wireless device 1005 may also include a processor. Each of these components may be in communication with one another (e.g., via one or more buses).

The receiver 1010 may receive information such as packets, user data, or control information associated with various information channels (e.g., control channels, data channels, and information related to modulation order split transmissions using a uniform constellation, etc.) in signal 1007. This information and/or signal 1007 may be passed on to other components of the device. The receiver 1010 may be an example of aspects of the transceiver 1240 described with reference to FIG. 12.

The base station split order transmission mapper 1015 may receive signals 1012, which may be a representation of a signal 1007. The base station split order transmission mapper 1015 may select a combined symbol constellation from a uniform symbol constellation based at least in part on a power ratio between a base-layer of a signal and an enhancement-layer of the signal, wherein the base-layer is associated with a first modulation order, the enhancement-layer is associated with a second modulation order, and the combined symbol constellation is down-selected from the uniform symbol constellation; map a first data stream and a second data stream to symbol locations of the combined symbol constellation to obtain a set of symbols for the signal, wherein the first data stream corresponds to a base-layer transmission for a first user equipment (UE) and the second data stream corresponds to an enhancement-layer transmission for a second UE; and transmit the signal to the first UE and the second UE. Base station split order transmission mapper 1015 may pass signals 1017 indicating the combined symbol constellation (e.g., modulation orders, power splits, etc.) or already mapped to the combined symbol constellation to transmitter 1020. The base station split order transmission mapper 1015 may be an example of aspects of the base station split order transmission mapper 1215 described with reference to FIG. 12.

The transmitter 1020 may transmit signals 1022 generated by other components of the device. Signals 1022 may be transmitted to other devices including a first and second data stream mapped according to a combined symbol constellation. In some examples, the transmitter 1020 may be collocated with a receiver 1010 in a transceiver module. For example, the transmitter 1020 may be an example of aspects of the transceiver 1240 described with reference to FIG. 12. The transmitter 1020 may include a single antenna, or it may include a set of antennas.

Figure 11:
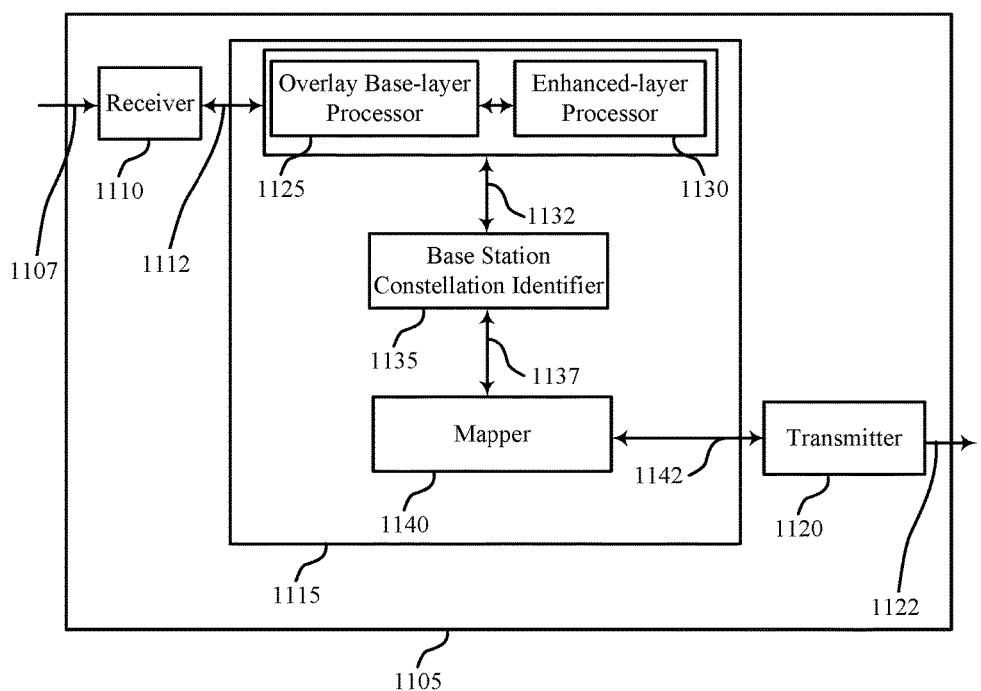

FIG. 11 shows a block diagram 1100 of a wireless device 1105 that supports modulation order split transmissions using a uniform constellation in accordance with various aspects of the present disclosure. Wireless device 1105 may be an example of aspects of a wireless device 1005 or a base station 105 as described with reference to FIGS. 1, 2 and 10. Wireless device 1105 may include receiver 1110, base station split order transmission mapper 1115, and transmitter 1120, which may be examples of a include receiver 1010, base station split order transmission mapper 1015, and transmitter 1020, as described with reference to FIG. 10. Wireless device 1105 may also include a processor. Each of these components may be in communication with one another (e.g., via one or more buses).

The base station split order transmission mapper 1115 may also include base-layer processor 1125, enhancement-layer processor 1130, base station constellation identifier 1135, mapper 1140, and transmitter 1120. The base station split order transmission mapper 1115 may be an example of aspects of the base station split order transmission mapper 1215 described with reference to FIG. 12.

The receiver 1110 may receive information such as packets, user data, or control information associated with various information channels (e.g., control channels, data channels, and information related to modulation order split transmissions using a uniform constellation, etc.) in signal 1107. The information and/or signal 1107 may be passed on to other components of the device. In some cases, receiver 1110 passes or transmits signal 1112 to the other components of the device. In some cases, signal 1112 may be a modified version of signal 1107 (e.g., filtered, amplified, etc.). In some cases, signal 1112 may be an unmodified version of signal 1107. The receiver 1110 may be an example of aspects of the transceiver 1240 described with reference to FIG. 12.

The base-layer processor 1125 may identify a first data stream for transmission in a base-layer of a signal to a first UE, where the base-layer is associated with a first modulation order based on signal 1007 (e.g., based on receiving data intended for a first UE).

The enhancement-layer processor 1130 may identify a second data stream for transmission in an enhancement-layer of the signal to a second UE, where the enhancement-layer is associated with a second modulation order based on signal 1007 (e.g., based on receiving data intended for a second UE). In some cases, the first modulation order corresponds to any of: quadrature phase shift keying (QPSK), 16-quadrature amplitude modulation (QAM), or 64-QAM and where the second modulation order corresponds to any of: QPSK, 16-QAM, or 64-QAM. The base-layer processor 1125 and the enhancement-layer processor 1130 may pass on information 1132 associated with the data streams and the identified UEs to base station constellation identifier 1135.

The base station constellation identifier 1135 may select a combined symbol constellation from a uniform symbol constellation based on the information 1132. In some cases, base station constellation identifier may select the combined symbol constellation based on a desired power ratio between the base-layer and the enhancement-layer and a size of the uniform symbol constellation, where the combined symbol constellation is down-selected from the uniform symbol constellation. The base station constellation identifier 1135 may select the uniform symbol constellation for transmission of the signal based on a modulation order capability of the second UE. In some cases, the combined symbol constellation is selected based on the first modulation order, the second modulation order, or a third modulation order associated with the uniform symbol constellation, or any combination thereof. In some cases, the third modulation order is greater than a product of the first modulation order and the second modulation order. In some cases, the third modulation order corresponds to 64-QAM, 256-QAM, or 1024-QAM. In some cases, the combined symbol constellation is selected from a set of combined symbol constellations included by the uniform symbol constellation that correspond to a set of power ratios. In some cases, the selected combined symbol constellation uses Gray code mapping. In other cases, the first modulation and second modulation orders and desired power ratio is determined based on information (e.g., SNR, location, etc.) known for the first and second UE. Base station constellation identifier 1135 may pass on an indication 1137 of the combined symbol constellation selected for the transmission of the first and second streams of data.

The mapper 1140 may map the first data stream and the second data stream to symbol locations of the combined symbol constellation to obtain a set of symbols for a signal 1142 to be transmitted based on the received indication 1137.

The transmitter 1120 may transmit signals 1122 generated by other components of the device. For instance, transmitter 1120 may transmit the signal 1142 generated by the base station split order transmission mapper 1115. In some examples, the transmitter 1120 may be collocated with a receiver 1110 in a transceiver module. For example, the transmitter 1120 may be an example of aspects of the transceiver 1240 described with reference to FIG. 12. The transmitter 1120 may include a single antenna, or it may include a set of antennas. In some examples, the transmitter 1020 may transmit the signal 1122 to the first UE and the second UE and transmit, to at least the second UE, an indication of any of: the power ratio, the first modulation order, the second modulation order, the third modulation order, the combined symbol constellation, the uniform symbol constellation, or any combination thereof.

Figure 12:
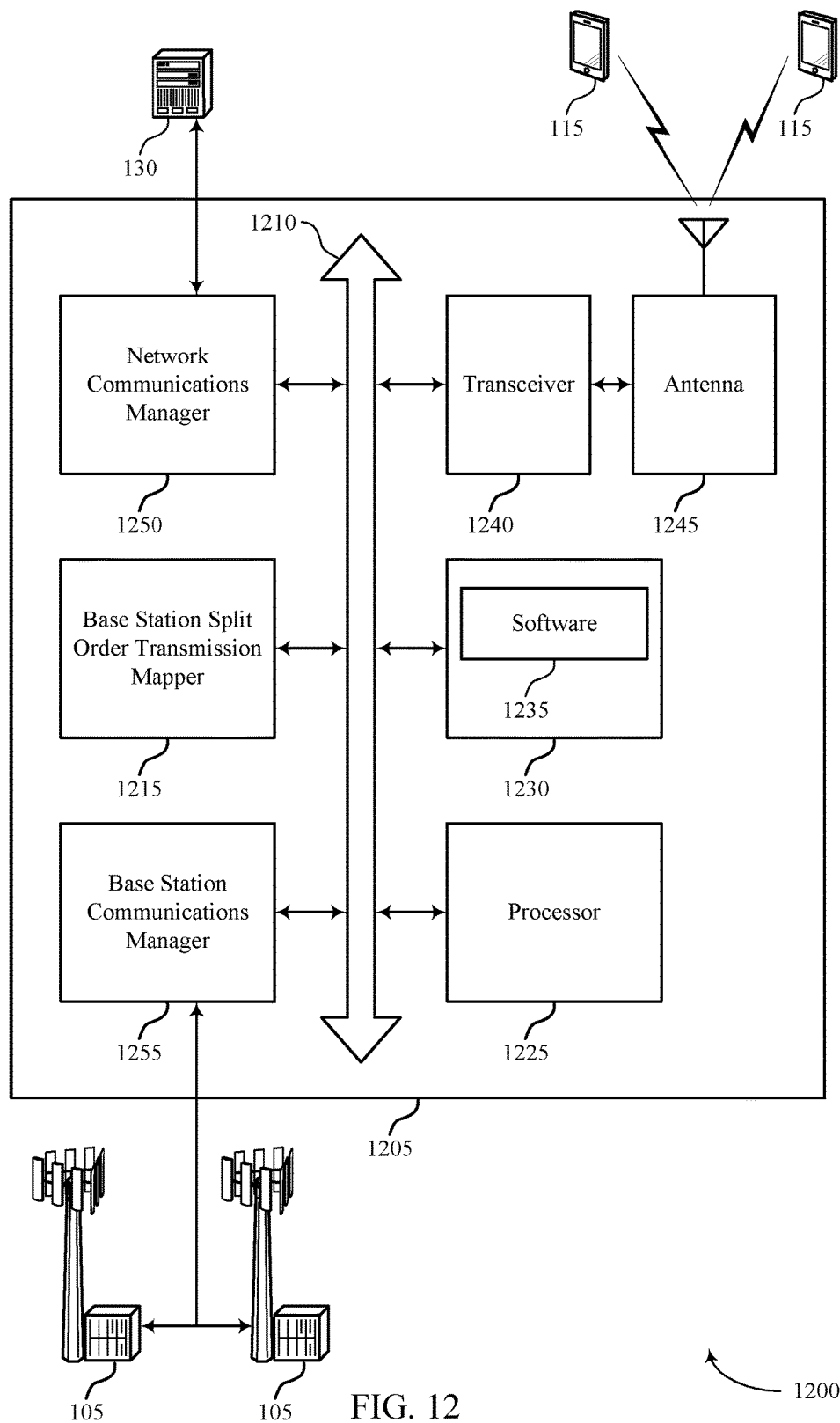
FIG. 12 illustrates a block diagram of a system including a base station that supports modulation order split transmissions using a uniform constellation in accordance with aspects of the present disclosure.

FIG. 12 shows a diagram of a system 1200 including a wireless device 1205 that supports modulation order split transmissions using a uniform constellation in accordance with various aspects of the present disclosure. Wireless device 1205 may be an example of a wireless device 1005, wireless device 1105, or a base station 105 as described above, e.g., with reference to FIGS. 1, 2, 10 and 11.

Wireless device 1205 may include components for bi-directional voice and data communications including components for transmitting and receiving communications, including base station split order transmission mapper 1215, processor 1225, memory 1230, software 1235, transceiver 1240, antenna 1245, network communications manager 1250, and base station communications manager 1255. Base station split order transmission mapper 1215 may be an example of a base station split order transmission mapper 1015 or base station split order transmission mapper 1115, as described with reference to FIGS. 10 and 11. Each of these components may communicate with one another via bus 1210.

The processor 1225 may include an intelligent hardware device, (e.g., a central processing unit (CPU), a microcontroller, an application specific integrated circuit (ASIC), etc.).

The memory 1230 may include random access memory (RAM) and read only memory (ROM). The memory 1230 may store computer-readable, computer-executable software 1235 including instructions that, when executed, cause the processor to perform various functions described herein. In some cases, the memory 1230 can contain, among other things, a Basic Input-Output system (BIOS) which may control basic hardware and/or software operation such as the interaction with peripheral components or devices.

Software 1235 may include code to implement aspects of the present disclosure, including code to support modulation order split transmissions using a uniform constellation. Software 1235 can be stored in a non-transitory computer-readable medium such as system memory or other memory. In some cases, the software 1235 may not be directly executable by the processor but may cause a computer (e.g., when compiled and executed) to perform functions described herein.

The transceiver 1240 may communicate bi-directionally, via one or more antennas, wired, or wireless links as described above. For example, the transceiver 1240 may represent a wireless transceiver and may communicate bi-directionally with another wireless transceiver. The transceiver 1240 may also include a modem to modulate the packets and provide the modulated packets to the antennas for transmission, and to demodulate packets received from the antennas.

In some cases, the wireless device may include a single antenna 1245. However, in some cases the device may have more than one antenna 1245, which may be capable of concurrently transmitting or receiving multiple wireless transmissions.

The network communications manager 1250 may manage communications with the core network (e.g., via one or more wired backhaul links). For example, the network communications manager 1250 may manage the transfer of data communications for client devices, such as one or more UEs 115.

The base station communications manager 1255 may manage communications with other base station 105, and may include a controller or scheduler for controlling communications with UEs 115 in cooperation with other base stations 105. For example, the base station communications manager 1255 may coordinate scheduling for transmissions to UEs 115 for various interference mitigation techniques such as beamforming or joint transmission. In some examples, base station communications manager 1255 may provide an X2 interface within an LTE/LTE-A wireless communication network technology to provide communication between base stations 105.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a base station, comprising:
   selecting a combined symbol constellation from a uniform symbol constellation based at least in part on a power ratio between a base-layer of a signal and an enhancement-layer of the signal, wherein the base-layer is associated with a first modulation order, the enhancement-layer is associated with a second modulation order, and the combined symbol constellation is down selected from the uniform symbol constellation;
   mapping a first data stream and a second data stream to symbol locations of the combined symbol constellation to obtain a set of symbols for the signal, wherein the first data stream corresponds to a base-layer transmission for a first user equipment (UE) and the second data stream corresponds to an enhancement-layer transmission for a second UE; and
   transmitting the signal to the first UE and the second UE.

2. The method of claim 1, further comprising:
   selecting the uniform symbol constellation for transmission of the signal based at least in part on a modulation order capability of the second UE.

3. The method of claim 1, wherein the combined symbol constellation is selected based at least in part on the first modulation order, the second modulation order, or a third modulation order associated with the uniform symbol constellation, or any combination thereof.

4. The method of claim 3, wherein the third modulation order is greater than a product of the first modulation order and the second modulation order.

5. The method of claim 3, further comprising:
   transmitting, to at least the second UE, an indication of any of: the power ratio, the first modulation order, the second modulation order, the third modulation order, the combined symbol constellation, the uniform symbol constellation, or any combination thereof.

6. The method of claim 3, wherein the first modulation order corresponds to any of:

quadrature phase shift keying (QPSK), 16 quadrature amplitude modulation (QAM), or 64 QAM and wherein the second modulation order corresponds to any of: QPSK, 16 QAM, or 64 QAM.

7. The method of claim 6, wherein the third modulation order corresponds to 64 QAM, 256 QAM, or 1024 QAM.

8. The method of claim 1, wherein the combined symbol constellation is selected from a plurality of combined symbol constellations comprised by the uniform symbol constellation that correspond to a plurality of power ratios.

9. The method of claim 1, wherein the selected combined symbol constellation uses Gray code mapping.

10. A method for wireless communications at a user equipment (UE), comprising:
receiving a signal based on a combined symbol constellation of a uniform symbol constellation, wherein the combined symbol constellation is down selected from the uniform symbol constellation; and
de mapping symbols of the received signal based at least in part on the combined symbol constellation to obtain a first data stream and a second data stream, wherein the first data stream is modulated according to a first modulation order and corresponds to a base-layer, and wherein the second data stream is modulated according to a second modulation order and corresponds to an enhanced-layer.

11. The method of claim 10, wherein the de mapping comprises determining likelihood ratios for data of the first data stream and the second data stream from the symbols of the received signal based on the combined symbol constellation.

12. The method of claim 10, further comprising:
decoding the second data stream based at least in part on the de mapping.

13. The method of claim 12, further comprising:
performing interference cancellation of the first data stream prior to the decoding based at least in part on the de mapping.

14. The method of claim 10, further comprising:
receiving an indication of any of: a power ratio between the base-layer and the enhancement-layer, the first modulation order, the second modulation order, a size of the uniform symbol constellation, the combined symbol constellation, the uniform symbol constellation, or any combination thereof.

15. The method of claim 10, wherein the de mapping is performed by a fixed bit width de mapper that supports the uniform symbol constellation.

16. The method of claim 10, wherein the de mapping is performed in a hardware de mapper that suppresses mapping to points of the uniform symbol constellation not in the combined symbol constellation.

17. The method of claim 10, wherein the combined symbol constellation uses Gray code mapping.

18. An apparatus for wireless communications, comprising:
means for selecting a combined symbol constellation from a uniform symbol constellation based at least in part on a power ratio between a base-layer of a signal and an enhancement-layer of the signal, wherein the base-layer is associated with a first modulation order, the enhancement-layer is associated with a second modulation order, and the combined symbol constellation is down selected from the uniform symbol constellation;
means for mapping a first data stream and a second data stream to symbol locations of the combined symbol constellation to obtain a set of symbols for the signal, wherein the first data stream corresponds to a base-layer transmission for a first user equipment (UE) and the second data stream corresponds to an enhancement-layer transmission for a second UE; and
means for transmitting the signal to the first UE and the second UE.

19. The apparatus of claim 18, further comprising:
means for selecting the uniform symbol constellation for transmission of the signal based at least in part on a modulation order capability of the second UE.

20. The apparatus of claim 18, further comprising:
means for transmitting, to at least the second UE, an indication of any of: the power ratio, the first modulation order, the second modulation order, a size of the uniform symbol constellation, the combined symbol constellation, the uniform symbol constellation, or any combination thereof.

21. An apparatus for wireless communications, comprising:
means for receiving a signal based on a combined symbol constellation of a uniform symbol constellation, wherein the combined symbol constellation is down selected from the uniform symbol constellation; and
means for de mapping symbols of the received signal based at least in part on the combined symbol constellation to obtain a first data stream and a second data stream, wherein the first data stream is modulated according to a first modulation order and corresponds to a base-layer, and wherein the second data stream is modulated according to a second modulation order and corresponds to an enhancement-layer.

22. The apparatus of claim 21, further comprising:
means for determining likelihood ratios for data of the first data stream and the second data stream from the symbols of the received signal based on the combined symbol constellation.

23. The apparatus of claim 21, further comprising:
means for decoding the second data stream based at least in part on the de mapped symbols.

24. The apparatus of claim 23, further comprising:
means for performing interference cancellation of the first data stream prior to the decoding based at least in part on the de mapped symbols.

25. The apparatus of claim 21, further comprising:
means for receiving an indication of any of: a power ratio between the base-layer and the enhancement-layer, the first modulation order, the second modulation order, a size of the uniform symbol constellation, the combined symbol constellation, the uniform symbol constellation, or any combination thereof.

26. An apparatus for wireless communications, in a system comprising:
a processor;
memory in electronic communication with the processor; and
instructions stored in the memory and operable, when executed by the processor, to cause the apparatus to:
select a combined symbol constellation from a uniform symbol constellation based at least in part on a power ratio between a base-layer of a signal and an enhancement-layer of the signal, wherein the base-layer is associated with a first modulation order, the enhancement-layer is associated with a second modulation order;
map a first data stream and a second data stream to symbol locations of the combined symbol constellation to obtain a set of symbols for the signal, wherein the first data stream corresponds to a base-layer transmission for a first user equipment (UE) and the second data stream corresponds to an enhancement-layer transmission for a second UE; and transmit the signal to the first UE and the second UE.

27. The apparatus of claim 26, wherein the instructions are further executable by the processor to:

select the uniform symbol constellation for transmission of the signal based at least in part on a modulation order capability of the second UE.

28. The apparatus of claim 26, wherein the instructions are further executable by the processor to:

select the combined symbol constellation based at least in part on the first modulation order, the second modulation order, or a third modulation order associated with the uniform symbol constellation, or any combination thereof.

29. The apparatus of claim 28, wherein the third modulation order is greater than a product of the first modulation order and the second modulation order.

30. The apparatus of claim 28, wherein the instructions are further executable by the processor to:

transmit, to at least the second UE, an indication of any of: the power ratio, the first modulation order, the second modulation order, the third modulation order, the combined symbol constellation, the uniform symbol constellation, or any combination thereof.

31. The apparatus of claim 26, wherein the selected combined symbol constellation uses Gray code mapping.

32. An apparatus for wireless communications, in a system comprising:

a processor;

memory in electronic communication with the processor; and instructions stored in the memory and operable, when executed by the processor, to cause the apparatus to:

receive a signal based on a combined symbol constellation of a uniform symbol constellation, wherein the combined symbol constellation is down selected from the uniform symbol constellation; and de map symbols of the received signal based at least in part on the combined symbol constellation to obtain a first data stream and a second data stream, wherein the first data stream is modulated according to a first modulation order and corresponds to a base-layer, and wherein the second data stream is modulated according to a second modulation order and corresponds to an enhancement-layer.

33. The apparatus of claim 32, wherein the instructions are further executable by the processor to:

determine likelihood ratios for data of the first data stream and the second data stream from the symbols of the received signal based on the combined symbol constellation.

34. The apparatus of claim 32, wherein the instructions are further executable by the processor to:

decode the second data stream based at least in part on the de mapped symbols.

35. The apparatus of claim 34, wherein the instructions are further executable by the processor to:

perform interference cancellation of the first data stream prior to the decoding based at least in part on the de mapped symbols.

36. The apparatus of claim 32, wherein the instructions are further executable by the processor to:

receive an indication of any of: a power ratio between the base-layer and the enhancement-layer, the first modulation order, the second modulation order, a size of the uniform symbol constellation, the combined symbol constellation, the uniform symbol constellation, or any combination thereof.

37. The apparatus of claim 32, wherein the combined symbol constellation uses Gray code mapping.

38. A non-transitory computer readable medium storing code for wireless communications, the code comprising instructions executable by a processor to:

select a combined symbol constellation from a uniform symbol constellation based at least in part on a power ratio between a base-layer of a signal and an enhancement-layer of the signal, wherein the base-layer is associated with a first modulation order, the enhancement-layer is associated with a second modulation order, and the combined symbol constellation is down selected from the uniform symbol constellation;

map a first data stream and a second data stream to symbol locations of the combined symbol constellation to obtain a set of symbols for the signal, wherein the first data stream corresponds to a base-layer transmission for a first user equipment (UE) and the second data stream corresponds to an enhancement-layer transmission for a second UE; and transmit the signal to the first UE and the second UE.

39. The non-transitory computer readable medium of claim 38, wherein the code is further executable to:

select the uniform symbol constellation for transmission of the signal based at least in part on a modulation order capability of the second UE.

40. The non-transitory computer readable medium of claim 38, wherein the code is further executable to:

select the combined symbol constellation based at least in part on the first modulation order, the second modulation order, or a third modulation order associated with the uniform symbol constellation, or any combination thereof.

41. The non-transitory computer readable medium of claim 40, wherein the third modulation order is greater than a product of the first modulation order and the second modulation order.

42. The non-transitory computer readable medium of claim 40, wherein the code is further executable to:

transmit, to at least the second UE, an indication of any of: the power ratio, the first modulation order, the second modulation order, the third modulation order, the combined symbol constellation, the uniform symbol constellation, or any combination thereof.

43. The non-transitory computer readable medium of claim 38, wherein the selected combined symbol constellation uses Gray code mapping.

44. A non-transitory computer readable medium storing code for wireless communications, the code comprising instructions executable by a processor to:

receive a signal based on a combined symbol constellation of a uniform symbol constellation, wherein the combined symbol constellation is down selected from the uniform symbol constellation; and de map symbols of the received signal based at least in part on the combined symbol constellation to obtain a first data stream and a second data stream, wherein the first data stream is modulated according to a first modulation order and corresponds to a base-layer, and wherein the second data stream is modulated according to a second modulation order and corresponds to an enhancement-layer.

45. The non-transitory computer readable medium of claim 44, wherein the code is further executable to:
determine likelihood ratios for data of the first data stream and the second data stream from the symbols of the received signal based on the combined symbol constellation.

46. The non-transitory computer readable medium of claim 44, wherein the code is further executable to:
decode the second data stream based at least in part on the de mapped symbols.

47. The non-transitory computer readable medium of claim 46, wherein the code is further executable to:
perform interference cancellation of the first data stream prior to the decoding based at least in part on the de mapped symbols.

48. The non-transitory computer readable medium of claim 44, wherein the code is further executable to:
receive an indication of any of: a power ratio between the base-layer and the enhancement-layer, the first modulation order, the second modulation order, a size of the uniform symbol constellation, the combined symbol constellation, the uniform symbol constellation, or any combination thereof.

49. The non-transitory computer readable medium of claim 44, wherein the combined symbol constellation uses Gray code mapping.

* * * * *